United States Patent
Chung et al.

(10) Patent No.: US 12,441,658 B2
(45) Date of Patent: Oct. 14, 2025

(54) NON-HYDRATION STRENGTH IN CEMENTITIOUS COMPOSITIONS

(71) Applicant: GCP Applied Technologies Inc., Cambridge, MA (US)

(72) Inventors: Byong-Wa Chung, Honolulu, HI (US); Nathan A. Tregger, Northborough, MA (US); Elise Berodier, Lausanne (CH); Elizabeth Burns, Windham, NH (US); Ernie Rocha, Merrimack, NH (US); Ezgi Wilson, Sydney (AU); Mark F. Roberts, North Andover, MA (US)

(73) Assignee: GCP Applied Technologies Inc., Malvern, PA (US)

( * ) Notice: Subject to any disclaimer, the term of this patent is extended or adjusted under 35 U.S.C. 154(b) by 1100 days.

(21) Appl. No.: 17/270,565

(22) PCT Filed: Aug. 29, 2019

(86) PCT No.: PCT/US2019/048830
§ 371 (c)(1),
(2) Date: Feb. 23, 2021

(87) PCT Pub. No.: WO2020/047267
PCT Pub. Date: Mar. 5, 2020

(65) Prior Publication Data
US 2021/0355031 A1  Nov. 18, 2021

Related U.S. Application Data

(60) Provisional application No. 62/724,282, filed on Aug. 29, 2018.

(51) Int. Cl.
*B28C 7/12* (2006.01)
*B28C 5/42* (2006.01)
(Continued)

(52) U.S. Cl.
CPC ............ *C04B 28/04* (2013.01); *B28C 5/4258* (2013.01); *B28C 7/128* (2013.01); *B33Y 70/10* (2020.01);
(Continued)

(58) Field of Classification Search
CPC ... C04B 22/14; C04B 24/2652; C04B 24/163; C04B 28/02; C04B 40/0028;
(Continued)

(56) References Cited

U.S. PATENT DOCUMENTS

| | | |
|---|---|---|
| 3,114,419 A | 12/1963 | Perry et al. |
| 3,216,966 A | 11/1965 | Collins et al. |

(Continued)

FOREIGN PATENT DOCUMENTS

| | | |
|---|---|---|
| CN | 106495615 | 3/2017 |
| DE | 3943836 | 10/2001 |

(Continued)

OTHER PUBLICATIONS

Abel, J.D. and Hover, K.C., "Field Study of the Setting Behavior of Fresh Concrete," Cement, Concrete and Aggregates, vol. 22, No. 2, Dec. 2000, pp. 95-102.
(Continued)

*Primary Examiner* — Christina A Johnson
*Assistant Examiner* — Kelsey C Grace
(74) *Attorney, Agent, or Firm* — Armstrong Teasdale LLP

(57) ABSTRACT

Described are compositions and methods for controlled strength development in a hydratable cementitious material, and more particularly to the use of polymerizable monomer components, which are initiated and activated by a redox pair which are mixed in controlled fashion, for enhancing non-hydration strength within the matrix of the plastic hydratable cementitious material before setting of the cementitious material begins. Exemplary applications
(Continued)

include minimizing pressures on formwork for high fluid ready-mix applications, enhancing support and bonding properties for integrated concrete slab work and other sequential applications, or facilitating speedy 3D printing applications, among other unique possibilities.

20 Claims, 9 Drawing Sheets

(51) Int. Cl.
| | |
|---|---|
| B33Y 70/10 | (2020.01) |
| C04B 22/14 | (2006.01) |
| C04B 24/26 | (2006.01) |
| C04B 28/04 | (2006.01) |
| C04B 40/00 | (2006.01) |
| B33Y 30/00 | (2015.01) |
| B33Y 80/00 | (2015.01) |
| C04B 103/00 | (2006.01) |
| C04B 111/00 | (2006.01) |

(52) U.S. Cl.
CPC .......... *C04B 22/14* (2013.01); *C04B 24/2647* (2013.01); *C04B 24/2652* (2013.01); *C04B 40/0028* (2013.01); *B33Y 30/00* (2014.12); *B33Y 80/00* (2014.12); *C04B 2103/0062* (2013.01); *C04B 2103/0095* (2013.01); *C04B 2103/0096* (2013.01); *C04B 2111/00155* (2013.01)

(58) Field of Classification Search
CPC ..... C04B 24/2647; C04B 28/04; C04B 14/06; C04B 22/147; C04B 24/16; C04B 4/2652; C04B 2103/0095; C04B 2103/0096; C04B 22/068; C04B 40/065; C04B 2103/0062; C04B 2111/00155; C04B 2111/00181; C04B 2201/05; B28C 5/4258; B28C 7/128; B33Y 70/10; B33Y 10/00; B33Y 80/00; B33Y 30/00
See application file for complete search history.

(56) References Cited

U.S. PATENT DOCUMENTS

| | | | |
|---|---|---|---|
| 3,493,529 | A | 2/1970 | Krottinger et al. |
| 3,591,542 | A | 7/1971 | Bonnel et al. |
| 3,892,704 | A * | 7/1975 | Higashimura ...... C04B 24/2641 524/650 |
| 4,015,991 | A | 4/1977 | Persinski et al. |
| 4,107,057 | A | 8/1978 | Dill et al. |
| 4,229,761 | A | 10/1980 | Thomas |
| 4,341,673 | A | 7/1982 | Trent et al. |
| 4,346,050 | A | 8/1982 | Trent et al. |
| 4,400,413 | A | 8/1983 | Emmons et al. |
| 4,473,689 | A | 9/1984 | Login et al. |
| 4,515,635 | A | 5/1985 | Rao et al. |
| 4,703,801 | A | 11/1987 | Fry et al. |
| 4,722,976 | A | 2/1988 | Ceska |
| 4,727,116 | A | 2/1988 | Lange et al. |
| 4,816,503 | A | 3/1989 | Cunningham et al. |
| 5,494,741 | A | 2/1996 | Fekete et al. |
| 5,596,036 | A | 1/1997 | Disch |
| 5,599,857 | A | 2/1997 | Allen |
| 5,663,267 | A | 9/1997 | Frost |
| 6,235,814 | B1 | 5/2001 | Bowe |
| 6,268,406 | B1 | 7/2001 | Chatterji et al. |
| 6,482,776 | B1 | 11/2002 | Matz et al. |
| 6,500,520 | B1 | 12/2002 | Wiercinski et al. |
| 6,691,715 | B2 | 2/2004 | Matz et al. |
| 6,858,661 | B2 | 2/2005 | Zhang et al. |
| 7,258,736 | B2 | 8/2007 | Oriakhi et al. |
| 7,265,168 | B2 | 9/2007 | Mitsui et al. |
| 7,968,178 | B1 | 6/2011 | Scurto et al. |
| 8,020,431 | B2 | 9/2011 | Cooley et al. |
| 8,118,473 | B2 | 2/2012 | Cooley et al. |
| 8,153,722 | B2 | 4/2012 | Nagelsdiek et al. |
| 8,162,057 | B2 | 4/2012 | Lewis et al. |
| 8,245,783 | B2 | 8/2012 | Lewis et al. |
| 8,311,678 | B2 | 11/2012 | Koehler et al. |
| 8,459,355 | B2 | 6/2013 | Lewis et al. |
| 8,491,717 | B2 | 7/2013 | Koehler et al. |
| 8,651,186 | B2 | 2/2014 | Lewis et al. |
| 8,662,174 | B2 | 3/2014 | Lewis et al. |
| 8,684,082 | B2 | 4/2014 | Lewis et al. |
| 8,727,604 | B2 | 5/2014 | Cooley et al. |
| 8,746,954 | B2 | 6/2014 | Cooley et al. |
| 8,764,272 | B2 | 7/2014 | Hazrati et al. |
| 8,764,273 | B2 | 7/2014 | Koehler et al. |
| 8,818,561 | B2 | 8/2014 | Koehler et al. |
| 8,858,061 | B2 | 10/2014 | Berman |
| 8,989,905 | B2 | 3/2015 | Sostaric et al. |
| 9,174,871 | B2 | 11/2015 | Carlson et al. |
| 9,199,391 | B2 | 12/2015 | Beaupre et al. |
| 9,296,938 | B2 | 3/2016 | Lewis et al. |
| 9,416,619 | B2 | 8/2016 | Aines et al. |
| 9,466,203 | B2 | 10/2016 | Jordan et al. |
| 9,546,533 | B2 | 1/2017 | Baldasaro |
| 9,550,312 | B2 | 1/2017 | Roberts et al. |
| 9,593,552 | B2 | 3/2017 | Aines et al. |
| 9,625,891 | B2 | 4/2017 | Berman |
| 9,670,094 | B2 | 6/2017 | Sorger et al. |
| 2009/0171595 | A1 | 7/2009 | Bonilla Benegas |
| 2013/0170314 | A1 * | 7/2013 | Hansson ........... B01F 25/31332 366/8 |
| 2013/0324674 | A1 | 12/2013 | Saleh et al. |
| 2014/0209308 | A1 | 7/2014 | Baldasaro et al. |
| 2017/0073267 | A1 | 3/2017 | Gallucci et al. |
| 2019/0002349 | A1 | 1/2019 | Yordakul et al. |

FOREIGN PATENT DOCUMENTS

| | | |
|---|---|---|
| JP | S4838605 B1 | 11/1973 |
| JP | S63291840 A | 11/1988 |
| JP | H10235623 A | 9/1998 |
| JP | 2007261920 A | 10/2007 |
| JP | 2010110802 A | 5/2010 |
| JP | 2013510786 A | 3/2013 |
| JP | 2013545845 A | 12/2013 |
| JP | 2017052289 A | 3/2017 |
| JP | 2017119737 A | 7/2017 |
| JP | 2019536725 A | 12/2019 |
| JP | 2020514103 A | 5/2020 |
| WO | 02083743 | 10/2002 |
| WO | 2007060272 | 5/2007 |
| WO | 2007060272 A2 | 5/2007 |
| WO | 2013064826 A1 | 5/2013 |
| WO | 2015073825 | 5/2015 |
| WO | 2015160610 A1 | 10/2015 |
| WO | 2017200543 | 11/2017 |
| WO | 2018083010 A1 | 5/2018 |
| WO | 2018115166 A1 | 6/2018 |

OTHER PUBLICATIONS

Dodson, Vance H., "Concrete Admixtures", Structural Engineering Series, Van Nostrand Reinhold, New York, NY, 1990, p. 1 (of Chapter 1—"Portland Cement").

Lin, Hong-Ru "Solution Polymerization of Acrylamide Using Potassium Persulfate as an Initiator. Kinetic Studies, Temperature and pH Dependence", European Polymer Journal, vol. 37, 2001, pp. 1507-1510.

Roussel, Nicolas., "Rheological Requirements for Printable Concretes," Cement and Concrete Research, vol. 112, 2018, pp. 76-85.

Samal, Rajani K.; "Transition Metal Chelates as Initiators of Vinyl Polymerization," Journal of Macromolecular Science Chemistry, Part A, vol. 18, Issue 5, 1982, pp. 719-757.

Sarac, A. S. "Redox Polymerization" Prog. Polym. Sci. 24, 1999, pp. 1149-1204.

(56) References Cited

OTHER PUBLICATIONS

Wangler et al., "Digital Concrete: Opportunities and Challenges," RILEM Technical Letters, vol. 1 (2016) pp. 67-75.
Chen, "Polyacrylamide and its derivatives for oil recovery", Doctoral Dissertations, Missouri University of Science and Technology, 2016, 226 pages.
Copenheaver, Form PCT/ISA/210, International Search Report for PCT/US2019/048830, 2 pages, dated Nov. 8, 2019.
Office Action mailed May 17, 2023 by the Japanese Patent Office (with English translation) for counterpart Japanese Patent Application No. 2021-510924.
International Search Report and Written Opinion for counterpart International Patent Application No. PCT/US2019/048830 mailed Nov. 8, 2019 by the United States Patent and Trademark Office in its capacity as International Searching Authority.

\* cited by examiner

NON-HYDRATION STRENGTH IN CEMENTITIOUS COMPOSITIONS

FIELD OF THE INVENTION

The present invention relates to controlled strength development in a hydratable cementitious material, and more particularly to the use of a polymerizing system within the matrix of the plastic hydratable cementitious material to increase non-hydration strength before setting of the cementitious material begins.

BACKGROUND OF THE INVENTION

Concrete contains hydraulic material (Portland cement) for binding together aggregates. Upon mixing with water, the cement binder begins to hydrate, and the hydrating concrete can be poured or formed into molds or formwork. The hydrating concrete will then eventually set into a pavement, foundation, slab, wall, pipe, or other structural shape.

FIG. 1 (PRIOR ART) illustrates graphically the strength of concrete (indicated along vertical axis at left) as the concrete is being transported from a batch plant towards a delivery (pour) site. During transport, the concrete will be in a fluid liquid state, as designated by the shaded area designated "A" in FIG. 1. The concrete will typically have high fluidity to enable quick pouring, to allow placement and finishing to be completed quickly (designated at "1"), and to keep labor expenses to a minimum. Consequently, from the end of the placement stage 1 to the beginning of the setting stage 2, as designated by the shaded area at "B" in FIG. 1, the narrow window (between 1 and 2) of workability closes rapidly as a function of time (indicated along horizontal axis).

It is known to use admixtures to control the initiation of setting of the concrete. For example, US Patent Publication No. 2017/0073267 describes use of superplasticizer and accelerator to obtain processing time and early strength.

As another example, U.S. Pat. Nos. 8,020,431, 8,764,272, and 8,818,561 teach that accelerator admixtures can be dosed into concrete loads just before pouring them into place.

While incorporating an accelerator before pouring the concrete is preferable when compared to adding accelerator at a plant to avoid having premature setting (e.g., due to traffic delays, form work delays, etc.), there are situations wherein the premature quick strength gain from accelerators is a disadvantage.

Premature strength gain is usually a disadvantage for concrete surface "finishing." Finishing techniques may include troweling, screed work, floating, edging, or jointing (See e.g., ACI 302.1R-15). Finishing of concrete surfaces is done to improve the durability and aesthetic appeal of the concrete.

As suggested in FIG. 1, finishing must begin after placement (1), but should be completed before the concrete begins to set (2). Finishing can only be accomplished, however, when the strength of the concrete is within an ideal range. A concrete mass having insufficient strength can change shape when subjected to the forces applied during the finishing operation; and, if strength is too high, the surface of the concrete cannot be moved and thus cannot be finished. Hence, a concrete slab that gains strength quickly has a finishing window that closes rapidly.

Excessively rapid strength gain in the concrete could also be a disadvantage where concrete is added in successive stages. For example, the construction of an "integrated concrete slab" involves depositing a concrete layer onto a previously cast first concrete layer, when both layers must be in a plastic state to enable an integrated region to form upon contact between the layers (See U.S. Pat. No. 7,968,178 of Scurto et al.). The first concrete layer must gain strength quickly to support the subsequent layer. However, if the strength builds too quickly, the concrete layers might not bond to form an integrated region. The result is that the upper concrete layer could curl and crack if not sufficiently integrated with the previously placed lower concrete layer.

The present inventors believe that the ability of a plastic cementitious material to maintain a level of strength to support subsequently applied cementitious material, without losing the ability to bond, can potentially enable other sequential applications to work better, such as large-scale, three-dimensional printing that uses extruded cementitious "printing" media. See e.g., "Digital concrete: Opportunities and challenges," by Wangler et al., RILEM Technical Letters, Vol. 1 (2016) pp. 67-75.

The present inventors believe that another application wherein high early strength is desired is in shotcrete or sprayed fire protection applications. An accelerator is typically injected at or near the spray nozzle that is used for spraying concrete or fire protection material, so that the settable material will set up quickly after it contacts a wall, beam, or other substrate. Although accelerators help build strength in the concrete quickly, they can also increase its elastic modulus too quickly such that material sprayed on top of the high-modulus concrete will bounce off, a phenomenon known as "rebound." A sprayed concrete with an intermediate strength and a lower modulus due to presence of a polymer network within the hydrating matrix of the concrete, can absorb the impact energy of material sprayed against it, resulting in lower rebound.

Further applications can include repair concrete (requiring quick stiffening, especially for overhead applications), cementitious tile adhesive (especially on vertical surfaces), slip-forming applications (where early stiffening is required), and vertical elements (e.g. columns and walls) where self-consolidating concrete is used (requiring quick stiffening to relieve formwork pressure).

SUMMARY OF THE INVENTION

In surmounting the aforementioned disadvantages of prior art applications, the present invention provides novel methods and additive composition packages for providing a gel-like polymer structure that is formed in-situ within the matrix of a hydrating cementitious material. The polymer structure formed in-situ can confer early age strength with desirable yield stress properties (e.g., malleability, or the ability to be formed or deformed) that need not depend upon the hydration reaction dynamics within the cementitious material.

Such in-situ polymerizing properties can confer increased workability windows and hence greater flexibility in various applications: such as wider finishing time windows for concrete slabs, longer integration windows for multi-layer concrete slabs (e.g., U.S. Pat. No. 7,968,178), faster sequentially applied concrete or mortar applications (e.g., 3D printing, concrete masonry units (CMU)), better segregation resistance especially for highly flowable mix designs (e.g., self-consolidating concrete), reduced danger to formwork rupture (such as tall structural columns) for pumped concrete applications, diminishing rebound in shotcrete applications, and other desirable properties.

As illustrated in FIG. 2, the present invention helps to achieve a high early strength or yield stress property during an extended period or window of time (between 1 and 2) illustrated by the shaded region designated at C, after the concrete is cast, molded, or placed. The completion of the placement stage is illustrated (as at 1) by the rightmost edge of the shaded area designated at A. Finishing may occur beginning at (1) and during the period of time (designated at C) before setting begins to occur (2) in the hydrating concrete or mortar, the setting stage being illustrated by the shaded area designated at B.

The present invention confers a novel method for controlling placement rheology, and also for extending the window of malleability in a plastic cementitious matrix. It does so without relying on conventional thickeners or thixotropy agents, which, in the past, have not been sufficient for extended "finishing" or the attainment of high green strength.

Thixotropy enhancements alone have not been sufficient to allow for more than a few layers of green concrete to be extruded during additive manufacturing (See e.g., Roussel, N., "Rheological requirements for printable concretes," in *Cement and Concrete Research*, 2018).

An exemplary method of the present invention for enhancing non-hydration strength in a hydrating cementitious composition, thus comprises:

(A) providing a settable composition comprising a hydratable cementitious binder, a plurality of aggregates, and water in an amount effective to establish a hydrating cementitious matrix;

(B) providing a polymerizable component system comprising (i) an ethylenic monomer having at least one hydrophilic group, (ii) at least one cross-linker monomer; and (iii) a first component of a two-component reduction-oxidation ("redox") system, to establish a cross-linking system within the hydrating cementitious matrix;

(C) mixing together the settable composition, the polymerizable component system, and a second component of the redox system such that the first and second components of the redox system become mixed together to activate cross-linking of the polymerizable component system within the hydrating cementitious matrix of the settable composition; and (D) flowing the mixture from step C through a nozzle, into a concrete formwork or mold, or through a nozzle and into a concrete formwork or mold, whereby the polymerizable component system undergoes polymerization within the hydrating settable cementitious matrix, and increases compressive strength, elastic modulus, or both compressive strength and elastic modulus of the settable composition before the binder sets.

In further exemplary embodiments, the polymerizable system components in step B are combined with the hydratable cementitious binder, the aggregates, or both, before, during, or after the hydratable cementitious binder is mixed with water to form a hydratable cementitious slurry.

In further exemplary embodiments, the aforementioned settable composition and polymerizable component system may be pumped into place using a hose. The second component of the redox system (e.g., sodium bisulfite) may be injected into the hose, or at or near the nozzle or end of the hose, to become mixed with the settable composition and first component of the redox system (e.g., potassium persulfate) to activate polymerization of the monomer components. This may be useful in pumped, highly fluid concrete mixes (e.g., self-consolidating concrete) and in shotcrete.

Optionally, a set accelerator admixture may also be introduced into the settable composition before or during pumping through the hose, or at or within a certain distance from the nozzle or end of the hose.

Exemplary methods and component system packages of the present invention are believed to be particularly useful in sequential applications, such as integrated concrete slabs and 3D printing involving the continuous extrusion of hydratable cementitious material onto itself.

To take integrated slab construction as a first example, a first concrete slab is laid down having the polymerizable component system which has been activated by mixing together of the first and second redox components to activate polymerization within the hydrating matrix of the cementitious system, such that a second concrete layer (which does not require the polymerization system but which can contain other components such as stretchable fibers) can be applied onto the first layer while it is in a plastic state. The use of the polymer components in the first (lower) layer will mean that the second (upper) layer can be applied much earlier in time, as the applicators will not have to wait for the first layer to build up sufficient green strength (via cement hydration) to support the subsequent upper layer (or to be able to be raked in preparation for laying down the upper layer); and, thus, a larger window of workability exists for ensuring that the sequentially applied slabs can "integrate" upon contact, whereby the upper concrete layer can better resist cracking and curling.

In another example, the quick buildup of green strength due to activation of polymerization components by the presence of redox components should enable faster application of sequential layering or attachment of mortar or concrete in 3D "printing" applications. Such benefits would include faster (green) strength development to support the buildup of extruded material; and would also include an extended "malleability window" (a period of workability before setting is initiated in the cementitious system) that would help to ensure that the cementitious materials applied at different times would be able to bond together. The redox pair might be mixed together with the polymerizable components and cementitious binder just before the hydratable cementitious composition is pumped through a hose and (moving) nozzle that extrudes the polymerizing/hydrating material into a processor-directed, three-dimensional article or structure involving a plurality of sequentially applied layers which may need to bond in vertical and/or horizontal directions with previously applied layers.

The present inventors believe that the "non-hydration strength" of the concrete achieved by polymerization (i.e., the strength gain not attributable to the hydration of the cement-based binder system used in the concrete) is orders of magnitude higher than any strength gains that could be achieved in green (plastic) concrete using conventional thickeners or thixotropy-enhancing chemical agents.

Further advantages and features of the invention are described in detail hereinafter.

BRIEF DESCRIPTION OF DRAWINGS

An appreciation of the benefits and features of the invention may be more readily comprehended when the following written description of preferred embodiments is considered in conjunction with the drawings.

DETAILED DESCRIPTION OF EXEMPLARY EMBODIMENTS

Figure 1:
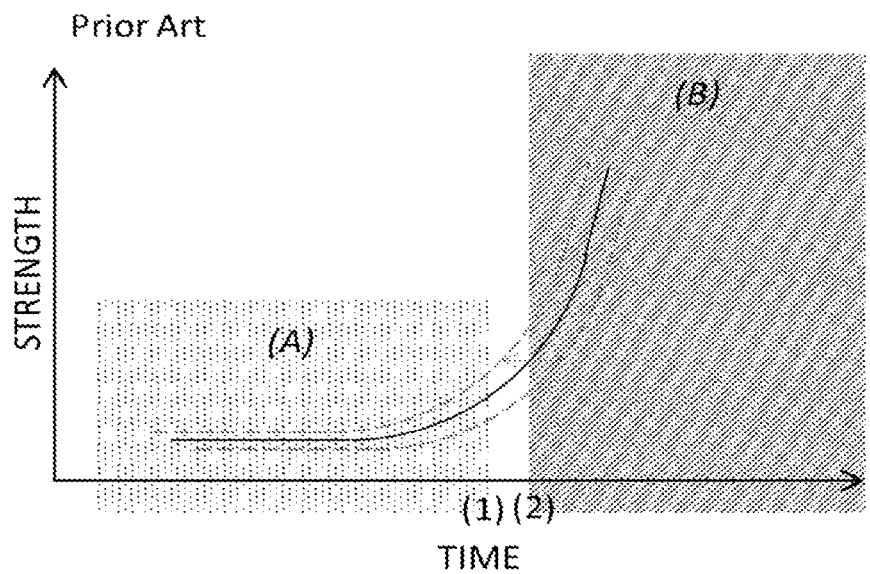
FIG. 1 is a graphic illustration of (PRIOR ART) strength evolution curve of a cementitious composition wherein a high flow-ability phase (A) is followed closely by setting phase (B). As previously discussed in the background, the relatively narrow "malleability window" or period of workability which begins at time designated at (1) and which expires at time designated at (2) begins to close rapidly.

Amounts of materials described herein are based on dry weight percentage unless otherwise specified.

The present invention now will be described more fully hereinafter with reference to the accompanying drawings, in which various exemplary embodiments are shown illustrating variations within the scope of the invention. This disclosure may, however, be embodied in many different forms, and should not be construed as limited to the embodiments set forth; rather, these embodiments are provided so that this disclosure will be thorough and complete and fully convey the scope of the invention to those of ordinary skill in the art.

As used herein, the term "activation" refers to a situation where the substantial generation of radical species occurs by addition of reducing chemical to oxidant, or by addition of oxidant to reducing chemical. In the scenario where a reduction-oxidation ("redox") reaction occurs, what may be referred to as the "initiator" (or oxidizer, or oxidizing agent) oxidizes what may be referred to as the "activator" (or reducer, or reducing agent).

The combination of the oxidizing agent and the reducing agent is referred to as the redox pair. This redox reaction leads to the generation of radical species, which then causes monomers to polymerize.

Redox pairs used to generate radical species are well known and discussed in the art. Persulfate/bisulfite pairs are widely used because of their low cost, effectiveness, and long industry experience. Other pairs may also be used, as are most effective in the system. The redox reaction may be catalyzed, with chelated iron, for example. Iron or other metal complexes may also participate directly as part of the redox pair. Where anions are listed, alkali, alkali earth, ammonium or other inactive cations are understood to be present. Oxidants include persulfate, hydrogen peroxide, t-butyl peroxide, p-menthol peroxide, iron (III), cobalt (III), copper (II). Reductants (used as activators in the examples) include bisulfite, N,N,N',N'-tetramethylene diamine, bis[2-(N,N-dimethylamino)-ethyl]ether sodium formaldehyde sulfoxilate, ascorbic acid, sucrose or other sugars, iron (II), cobalt (II), copper (I). See e.g., Samal, R. K.; J. Macromolecular Sci: Part A, volume 18, 1982, issue 5, pages 719-757. Sarac, A. S. Prog. Polym. Sci. 1999, volume 24, issue 8, pages 1149-1204. Lin, H-R. European Polymer Journal, 2001, volume 37, issue 7, pages 1507-1510.

Free radical initiators that are soluble in high pH water may also be used, added in place of the activator. In such cases, no other initiator is needed, but heat may be added to initiate or accelerate the polymerization, such as at the nozzle of an additive manufacturing device. Examples of such water soluble initiators are, for example 2,2'-azobis[2-(2-imidazolin-2-yl)propane], 2,2'-Azobis[N-(2-carboxyethyl)-2-methylpropionamidine]hydrate, 2,2'-Azobis-[2-methyl-N-(2-hydroxyethyl)propionamide, t-butylhydroperoxide, di(t-butylcyclohexyl)-peroxycarbonate, t-butyl peroxydneodecanoate, dilauryl peroxide, and mixtures thereof.

As used herein, the term "monomer" refers generally to a polymerizable, ethylenically-unsaturated organic compound which polymerizes by radical initiation. More particularly, the term "monomer" is used to refer to any vinyl-substituted molecule capable of polymerizing with other vinyl-substituted molecules to generate an oligomer or polymer. Exemplary monomers of this type are represented by the structural formula

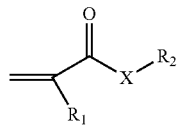

wherein $R_1$ is typically H or $CH_3$, but may be an alkyl group having of up to four carbon atoms; $R_2$ may be H or any alkyl, aryl, alkyl-aryl, and may contain such functional groups such as ethers, alcohols, amines or the salts thereof, sulfonic, carboxylic or phosphorous acids or the salts there of, and X is O, NH, or $N(R_3)$ where $R_3$ is $CH_3$ or $CH_2CH_3$. For (meth)acrylate or (meth)acrylamide groups, this means that $R_1$ is either H or $CH_3$.

Among monomers, water soluble monomers are particularly useful; that is, any monomer that is soluble at a level of 5 g/95 g water, or 5% active solids minimum based on weight of water. Water soluble monomers may be non-ionic, anionic or cationic.

Nonionic monomers contemplated for use in the present invention may include, for example, ethers, amides, alcohols, or mixtures thereof. Monomers such as polyethylene glycol acrylate, polyethyelene glycol acrylamide, hydroxyl ethyl acrylate, acrylamide, N-methyl acrylamide, methacrylamide, tetrahydrofurfuryl acrylate, vinyl pyrollidone, N-vinyl caprolactam, are included in this category. Amine-containing monomers are nonionic at cement pore water pH, including aminoethyl(meth)acrylate and aminoethyl(meth)acrylamide, dimethylaminoethyl(meth)-acrylate, dimethylaminoethyl-(meth)acrylamide, 2-vinyl pyridine, 4-vinyl pyridine. Among these, acrylamide and its derivatives are preferred.

Cationic monomers may also be water soluble. Various tertiary amine-containing monomers may be quaternized by methods known in the art to retain a cationic charge at high pH, for example, dimethylaminoethyl(meth)acrylate, dimethylaminoethyl-(meth)acrylamide, 2-vinyl pyridine, 4-vinyl pyridine.

Among water soluble monomers contemplated for use in the present invention, anionic monomers, or ionizable monomers that generate anions, are preferred. Typical of this class of monomer are carboxylic acid containing monomers, sulfonic acid containing monomers and phosphonic acid containing monomers. Carboxylic acid containing monomers include (meth)acrylic acid, and carboxyethylacrylate; sulfonic acid containing monomers include sulfoethylacrylate, vinyl sulfonic acid and acryl-amidepropanesulfonic acid; phosphonic include phosphoethylacrylate, phosphoethyl-acrylamide and vinyl phosphonic acid. Sulfonic acid containing monomers are particularly preferred, such as acrylamidopropane sulfonic acid.

The term crosslinker as used herein refers to any water soluble monomer, as defined most broadly above, that has two, three, four, or more polymerizable groups. Difunctional water-soluble crosslinkers can include ethylenediacrylate, ethylenebis-acrylamide, methylenebisacrylamide, polyethyleneglycol diacrylate, ethoxylated bisphenol A diacrylate, zinc dimethacrylate, zinc diacrylate, Trifunctional monomers include trimethylol propane triacrylate, ethoxylated trimethylol propane triacrylate. Higher functionality such as ethoxylated pentaerythritol tetraacrylate may also be used. Bisacrylamide crosslinkers are preferred.

As used herein, the term "concrete" refers to a mixture incorporating water, cementitious binder (e.g. Portland cement) optionally with supplemental cementitious materials chosen from slag, silica fume, fly ash, limestone; and the concrete further contains aggregates (e.g. sand, gravel), and optionally one or more chemical admixtures (e.g. water-reducers, set accelerator, set retarder, air entrainer, air detrainer, shrinkage reducing admixtures, corrosion inhibitors, or mixture thereof), or other admixtures for modifying a property of the concrete, whether in its plastic or hardened state.

As used herein, the term "cement" includes hydratable cement such as Portland cement which is produced by pulverizing clinker consisting of hydraulic calcium silicates, aluminates and aluminoferrites, and one or more forms of calcium sulfate (e.g., gypsum) as an interground additive. Typically, Portland cement is combined with one or more supplemental cementitious materials (e.g., fly ash, slag, limestone, natural pozzolans, or mixtures thereof) and provided as a blend. Thus, "cement" and "cement binder" may also include supplemental cementitious materials which have been inter-ground with Portland cement during manufacture.

As used herein, the term "cementitious" may be used herein to refer to materials that comprise Portland cement or which otherwise function as a binder to hold together fine aggregates (e.g., sand) and coarse aggregates (e.g., crushed gravel, stone) which are used for constituting concrete. It is mentioned here that while "mortar" usually refers to cement and fine aggregate (sand), "concrete" is a mortar that further includes coarse aggregate (e.g., crushed stone, gravel), the terms "mortar" and "concrete" may be used interchangeably herein.

As used herein, the term "hydratable" refers to cement or cementitious materials that are hardened by chemical interaction with water. Portland cement clinker is a partially fused mass primarily composed of hydratable calcium silicates. The calcium silicates are essentially a mixture of tricalcium silicate ($3CaO \cdot SiO_2$ or "$C_3S$" in cement chemists' notation) and dicalcium silicate ($2CaO \cdot SiO_2$, "$C_2S$") in which the former is the dominant form, with lesser amounts of tricalcium aluminate ($3CaO \cdot Al_2O_3$, "$C_3A$") and tetracalcium aluminoferrite ($4CaO \cdot Al_2O_3 \cdot Fe_2O_3$, "$C_4AF$"). See e.g., Dodson, Vance H., Concrete Admixtures (Van Nostrand Reinhold, New York, NY 1990), page 1.

As used herein, "non-hydration strength" shall refer to strength that is not attributable to the setting/hardening of the hydrating cement; but, rather, such strength is considered to be attributable to polymerization structures or gelation occurring within the cementitious matrix, where in-situ polymerization has been activated by the redox pair.

Preferably, one may appreciate this non-hydration strength as the cementitious composition will be able to support a load or bear its own weight, or otherwise be able to resist deformation due to gravity or pressure, at a point sooner in time as compared to the hydrating cementitious matrix that did not contain the polymerizable monomers and redox components as described hereinabove. It should be noted that the green strengths achievable through polymerization are orders of magnitude higher than what can be accomplished using thixotropic thickening agents.

As shown in examples appearing towards the end of this detailed specification, a penetrometer may be used to quantify the non-hydration strength (or deformation resistance) conferred to the hydratable cementitious composition by in-situ polymerization.

The methods and compositions of the present invention are preferably accomplished by using an automated concrete slump monitoring system, which can be programed to monitor desired slump or yield stress conditions in the hydrating concrete, and otherwise to ensure complete mixing of components while helping to avoid over-mixing.

As used herein, the phrase "automated concrete slump management (monitoring) systems" will refer to processor-controlled sensors and sensor systems which are used for monitoring slump or other rheological properties. Such monitoring systems are commercially available, for example, from GCP Applied Technologies Inc., 62 Whittemore Avenue, Cambridge, Massachusetts, USA, under the VERIFI® brand name. GCP and its subsidiary Verifi, LLC, have taught various automated concrete monitoring methods and systems in various patents, including U.S. Pat. Nos. 8,020,431; 8,118,473; 8,311,678; 8,491,717; 8,727,604; 8,746,954; 8,764,273; 8,818,561; 8,989,905; 9,466,203; 9,550,312; PCT/US2015/025054 (Publ. No. WO 2015/160610 A1); PCT/US2014/065709 (Publ. No. WO2015073825 A1), and other publications.

Alternatively, the slump monitoring system may be based on the use of a force sensor mounted within the concrete mixer drum. Various force sensors are disclosed, for example, in U.S. Pat. Nos. 8,858,061 and 9,625,891 of Berman (owned by GCP Applied Technologies of Cambridge, Massachusetts USA); U.S. Pat. No. 9,199,391 of Denis Beaupre et al. (I.B.B. Rheologie Inc.); and US Publication No. 2009/0171595 and WO 2007/060272 of Benegas.

While automated concrete monitoring systems are known for monitoring slump, it will be understood that these sensor systems are applicable for monitoring rheology parameters which also include slump flow, yield stress, viscosity, and other rheological parameters. The term "slump" is used in the present specification to illustrate conveniently any of these rheology parameters; and it should be understood that the present invention covers the monitoring of other rheology parameters even when only the word "slump" is used.

It is noted that the present inventors prefer the use of VERIFI® brand monitoring systems. These systems employ hydraulic pressure sensors and rotational drum speed sensors that are continually sampled by the system processor at numerous times per drum rotation. This quickly enables the system processor to ensure that the cementitious binder, aggregates, and other components are completely mixed within the drum, and that the cementitious mix can then be unloaded quickly to afford as wide a workability window as possible (e.g., for surface finishing of large floor slabs or decks).

The following paragraphs describe various example embodiments of the present invention, as well as various additional aspects of the examples.

In a first example embodiment, the present invention provides a method for achieving non-hydration strength in a cementitious composition, comprising:

(A) providing a settable composition comprising a hydratable cementitious binder, a plurality of aggregates, and water in an amount effective to establish a hydrating cementitious matrix:

(B) providing a polymerizable component system comprising (i) an ethylenic monomer having at least one hydrophilic group, (ii) at least one cross-linker monomer; and (iii) a first component of a two-component reduction-oxidation ("redox") system, to establish a cross-linking system within the hydrating cementitious matrix;

(C) mixing together the settable composition, the polymerizable component system, and a second component of the redox system such that the first and second components of the redox system become mixed together to activate cross-linking of the polymerizable component system within the hydrating cementitious matrix of the settable composition; and (D) flowing the mixture from step C through a nozzle, into a concrete formwork or mold, or through a nozzle and into a concrete formwork or mold, whereby the polymerizable component system undergoes polymerization within the hydrating settable cementitious matrix, and increases compressive strength, elastic modulus, or both compressive strength and elastic modulus of the settable composition before the binder sets.

In a second example embodiment, which may be based on the first example embodiment described above, the present invention provides a method wherein the hydratable cementitious binder comprises ordinary Portland cement, and optionally at least one supplemental cementitious material chosen from calcium carbonate, fly ash, slag, silica fume, calcined clay, metakaolin, limestone, and mixtures thereof.

In a first aspect of this second example embodiment, hydratable cementitious binders are substantially devoid of fast setting cements such as aluminate cements (<1% by weight).

In a second aspect of the second example embodiment, hydratable cementitious binders are substantially devoid of soil (<1% by weight). By "substantially devoid of soil," the present inventors intend that the hydrating settable cementitious matrix contains substantially Portland cement and aggregates, and that the aggregates conform to ASTM C33.

In a third aspect of the second example embodiment, the method does not require external applied radiation to initiate curing or hardening of the polymer system. In other words, the polymerization can be initiated without use of external applied radiation.

In a fourth aspect of the second example embodiment, the invention can involve external application of heat to aid in the curing of the cementitious binder. For example, in precast applications, concrete may be heated. The heating will accelerate the hydration of concrete or mortar which are molded, for example, into blocks, stairs, segmental retaining units, tiles, or other concrete masonry units. The use of heating would accelerate the curing process, but not necessarily have a significant impact on the polymerization.

In a fifth aspect of the second example embodiment, the methods of the invention involve the use of monomers in an amount of 0.1 to 30.0 percent, and more preferably 0.3 to 15.0 percent, and most preferably 0.5 to 8.0 percent, by dry weight based on the combined weight of the cementitious binder and water.

In a third example embodiment, which may be based on any of the first through second example embodiments described above, the present invention provides a method wherein the concrete is flowed into formwork or mold chosen from flooring slab, vertical column, wall, or a concrete masonry unit.

In a first aspect of this third example embodiment, the method involves flowing the settable composition into a horizontal form for making a concrete slab, whereby the concrete slab has a finishing surface of at least 30 minutes (according to ACI 302.1R-15).

In a second aspect of this third example embodiment, the method involves flowing the settable composition into a horizontal form for making a concrete slab, whereby the concrete slab has a finishing surface of at least 60 minutes (according to ACI 302.1R-15).

In a third aspect of this third example embodiment, the method involves flowing the settable composition into a wooden form work (e.g., made from wood, steel, or plastic), whereby the settable composition having the polymerizable components activated by the redox pair exerts 25% less hydrostatic pressure compared to settable composition that does not have the polymerizable components, and more preferably 50% less hydrostatic pressure compared to settable composition that does not have the polymerizable components.

In a fourth aspect of this third example embodiment, the method involves flowing the settable composition through both a hose and nozzle.

In a fifth aspect of this third example embodiment, the method involves flowing the settable composition through a hose and nozzle into vertical formwork, and to reduce the pressure on the formwork (as compared to pouring ready-mix concrete not in combination with the polymerizable component system).

In a sixth aspect of this third example embodiment, the method involves flowing the settable composition through both a hose and nozzle against a substrate, such as a concrete tunnel liner or cladding surface, or subterranean excavation surface.

In a seventh aspect of this third example embodiment, the concrete is flowed into mold for making stairs, bricks, blocks, pavers, or other concrete masonry units.

In an eighth aspect of this third example embodiment, the concrete is slip-formed into place using an extruder or slip-form paving machine (See e.g., slip-form paving machines commercially available from Gomaco Inc.)

In a fourth example embodiment, which may be based on any of the first through third example embodiments described above, the present invention provides a method wherein the nozzle is a shotcrete nozzle for spray application of shotcrete against a substrate (e.g., tunnel wall, excavation wall), a nozzle at the end of a hose for pumping concrete from a pump mixer to an application point on a construction site, or a nozzle controlled by a processor for printing sequential add-on layers in a three-dimensional structure made of the settable composition (e.g., via 3D printer).

In a first aspect of this fourth example embodiment, the settable composition and polymerizable component system are mixed together using independent pumps, one comprising the activator and one comprising the initiator, and pumped through a hose to the nozzle at the end of the hose.

In a fifth example embodiment, which may be based on any of the first through fourth example embodiments described above, the present invention provides a method wherein the provided ethylenic monomer having at least one hydrophilic group has a structural formula chosen from
  (i) $CH_2=CR-CO-NR^1R^2$;
  (ii) $CH_2=CR-CO-OR^3$;
  (iii) $CH_2=CR-O-R^4$;
  (iv) $CH_2=CR-R^5-O-R^4$, or mixture thereof; and
  the provided cross-linker monomer has a structural formula Y'—X'—Y" wherein X' represents methylene, ethylene, poly(ethylene glycol) or ethoxylated bisphenol A, and each of Y' and Y" are independently represented by a structural formula chosen from
  (i) $-CH=CR-CO-NR^1R^2$;
  (ii) $-CH=CR-CO-OR^3$;
  (iii) $-CH=CR-O-R^4$;
  (iv) $-CH=CR-R^5-O-R^4$, or mixture thereof;
wherein R represents hydrogen or a $C_1$-$C_4$ alkyl or alkenyl group; $R^1$, $R^2$, and $R^3$ each independently represent hydrogen or a $C_1$-$C_4$ alkyl, alkenyl, hydroxyalkyl, alkylsulfonate, alkylphosphonate, alkylphosphate, or carboxyalkyl group; $R^4$ represents a $C_1$-$C_4$ alkyl, alkenyl, hydroxyalkyl, alkylsulfonate, alkylphosphonate, alkylphosphate, or carboxyalkyl group; and $R^5$ represents a $C_1$-$C_4$ alkane or alkene group.

In a first aspect of the fifth example embodiment, the ethylenic monomer having at least one hydrophilic group is a charged hydrophilic monomer.

In a second aspect of this fifth example embodiment, the ethylenic monomer having at least one hydrophilic group has a water solubility of at least 5 g/95 g of water.

In a third aspect of this fifth example embodiment, the polymerizable component system and a second component of the redox system such that the first and second components of the redox system become mixed together to activate cross-linking of the polymerizable component system; wherein the polymerizable component system is mixed with the settable composition within a continuous aqueous phase. In other words, the polymerizable component system is not a water-in-oil emulsion (as the water phase is continuous).

In a fourth example embodiment, which may be based on any of the first through fifth example embodiments described above, the present invention provides a method wherein the settable composition of step A and the polymerizable component system of step B accomplished using a batch mixer (e.g., rotatable mixer drum) or continuous mixer (e.g., twin screw mixer), and the second component of the redox system of step C is introduced into the settable composition during or after the mixing of the settable composition with the polymerizable component system.

In a first aspect of this sixth example embodiment, the mixer can be a batch mixer at a ready-mix plant, or the mixer drum of a concrete delivery truck.

In a second aspect of this sixth example embodiment, the settable composition and polymerizable component system are mixed in a rotatable mixer drum of a concrete delivery truck, the mixer drum having at least two blades mounted spirally within the mixer drum, and the mixer drum comprising at least one sensor connected to an automated concrete monitoring system which monitors the concrete contained within the mixer drum.

In a third aspect of this sixth exemplary embodiment, the settable composition of step A and the polymerizable component system of step B accomplished using a mixer (e.g., rotatable mixer drum) or continuous mixer (e.g., twin screw mixer) at a batch plant, and the second component of the redox system of step C is introduced into the settable composition during or after the transportation of the settable composition with the polymerizable component system of step B to a jobsite by a fluid delivery system mounted on a concrete delivery truck.

In a fourth aspect of this sixth exemplary embodiment, a plurality of concrete delivery trucks each having an automated concrete (e.g., slump) monitoring system is used for delivering settable composition having the first redox system component; and for introducing into the settable composition a second redox system component based on data obtained previously through concrete delivery truck monitoring system.

Figure 3:
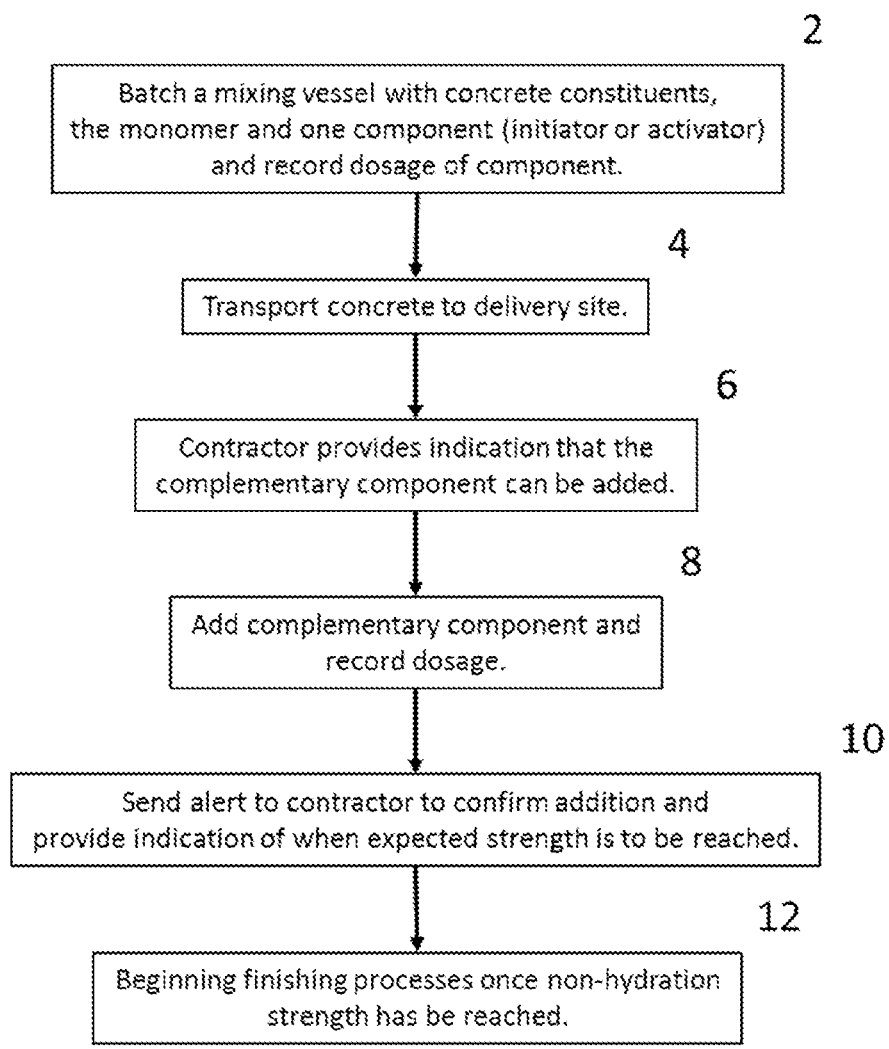
FIG. 3 is a graphic illustration of an exemplary method of the present invention for initiating polymerization of a monomer and initiator or activator within a hydratable concrete used in a slab manufacture operation.

FIG. 3 outlines an exemplary method of the present invention. A load of concrete is first batched into a mixing vessel with typical concrete components comprising the coarse and fine aggregate, cement, water and optionally chemical admixtures such as water reducers, superplasticizers, air entrainers, retarders, accelerators, rheology modifiers, shrinkage reducing agents, clay mitigating agents, etc. (block 2). The mixing vessel can be, for example, a mixer truck with a mixer drum or alternatively, a stationary mixer as found in central batching plants or precast concrete plants. In addition to these materials, one of either the monomer and either the initiator or activator is added while the dosage of each component is recorded. In one preferred embodiment, the monomer is added with the cement. In a more preferred embodiment, a cross-linker is also added with the monomer. A preferred system includes an 2-Acrylamido-2-methylpropane sulfonic acid (AMPS) monomer, an N,N-methylene bis(acrylamide) (bis-AAm) cross-linker and potassium persulfate (KPS) initiator. Mixing is then performed to ensure a sufficiently homogenized material. In block 4, the concrete is transported to a delivery pour-site where the concrete will be placed. This can be accomplished by the mixer truck, a bucket loader or other means to transport the plastic concrete. At this point, the complementary component (either the initiator or the activator that was not added in block 2) can be added. In one preferred embodiment, the complementary component is dosed through a fluid delivery system attached to the mixer (see e.g. U.S. Pat. No. 8,020,431; 8,764,272 or 8,818,561). A preferred composition includes a sodium bisulfite activator. It is preferred that the complementary component dosing schedule is triggered by a contractor or jobsite foreman who may delay the addition based on, for example, jobsite delays, crew availability or other scheduling changes [block 6]. It is envisioned that a trigger may alternatively be automatically decided by a construction scheduling system that is monitoring activity of the site. If the addition of the complementary component is delayed (e.g. due to a jobsite delay), the fluid delivery system may be programmed to add other chemicals such as superplasticizers or other water-reducers to maintain the concrete rheology until the complementary component is ready to be added. Once the complementary component is added and the dosage recorded [block 8], the contractor or jobsite foreman can be alerted of the addition [block 10] and based on the recorded dosages of the chemicals added, an indication can be provided to the contractor that gives an estimate of when the expected non-hydration strength is to be achieved, and optionally, when the concrete will set. This can be provided, for example, on a mobile app on a tablet or phone. Alternatively, the fluid delivery system can be programmed to deliver a given dosage to achieve a desired time at which the non-hydration strength gain is achieved. This dosage can be adjusted based on factors that affect the concrete stiffening and setting such as the concrete temperature, ambient temperature, relative humidity, wind speed, etc. Once the non-hydration strength is achieved, further construction processes can take place such as finishing of a slab [block 12].

In a fourth aspect of this sixth example embodiment, the method further comprises injecting water, a chemical dispersant polymer admixture (which plasticizes the hydrating settable composition), a set retarder, a set accelerator, or mixture thereof, into the concrete mix as contained in the rotatable mixer drum of a concrete delivery truck, prior to introduction of the second component of the redox pair.

In a fifth aspect of the sixth example, embodiment, the method further comprises admixing at least two different superplasticizing admixtures with the settable composition. A commercial product containing a number of superplasticizing polycarboxylate type dispersants is available from GCP Applied Technologies Inc. of Cambridge MA under the CONCERA® trade name, which confers excellent flowability properties to concrete mixes.

In a seventh example embodiment, which may be based on any of the first through sixth example embodiments described above, the present invention provides a method wherein the ethylenic monomer having at least one hydrophilic group is 2-acrylamido-2-methylpropane sulfonic acid ("AMPS") monomer, and the cross linker monomer is N,N'-methylene bis(acrylamide) ("bis-AAm"), and the weight ratio of AMPS:bis-AAm is from 5:95 to 99.9:0.1.

In a first aspect of this seventh example embodiment, the weight ratio of AMPS:bis-AAm is from 10:90 to 95:5.

In a second aspect of this seventh example embodiment, the weight ratio of AMPS:bis-AAm is from 50:50 to 90:10.

In an eighth example embodiment, which may be based on any of the first through seventh example embodiments described above, the invention provides a method wherein the redox pair may comprise a persulfate, hydrogen peroxide, t-butyl peroxide, p-menthol peroxide, iron (III), cobalt (III), copper (II). Reductants (used as activators in the examples) include bisulfite, N,N,N',N'-tetramethylene diamine, bis[2-(N,N-dimethylamino)-ethyl]ether sodium formaldehyde sulfoxilate, ascorbic acid, sucrose or other sugars, iron (II), cobalt (II), copper (I) and bisulfite, N,N, N',N'-tetramethylene diamine, bis[2-(N,N-dimethylamino)-ethyl]ether sodium formaldehyde sulfoxilate, ascorbic acid, sucrose or other sugars, iron (II), cobalt (II), and copper (I).

In a ninth example embodiment, which may be based on any of the first through eighth example embodiments described above, the present invention provides a method wherein, in step B, the settable composition is mixed in the rotatable mixer drum of a concrete delivery truck; and wherein, in step D, the settable composition is pumped through a hose or flowed along a chute into a placement point comprising a wooden form for a building wall or floor, a concrete slab or floor, bridge deck, rebar concrete structure, a structural column, or concrete paver unit.

The present inventors believe that, compared to a ready-mix concrete that does not contain the polymerizable component system, the use of the polymerizable component system, when the first and second agents of the redox pair are mixed together to initiate polymerization, will increase the time window within which a concrete slab is finishable.

In a first aspect of this ninth example embodiment, the method involves flowing the settable composition into a horizontal form for making a concrete slab, whereby the concrete slab has a finishing surface of at least 30 minutes (according to ACI 302.1R-15).

In a second aspect of this ninth example embodiment, the method involves flowing the settable composition into a horizontal form for making a concrete slab, whereby the concrete slab has a finishing surface of at least 60 minutes (according to ACI 302.1R-15).

In a third aspect of this ninth example embodiment, the method involves flowing the settable composition into a wooden, plastic or steel form work, whereby the settable composition having the polymerizable components activated by the redox pair exerts 25% less hydrostatic pressure compared to settable composition that does not have the polymerizable components, and more preferably 50% less hydrostatic pressure compared to settable composition that does not have the polymerizable components.

In a tenth example embodiment, which may be based on any of the first through ninth example embodiments described above, the invention provides a method wherein, in step D, the settable composition is pumped through a hose.

In a first aspect of this tenth example embodiment, the substrate is a concrete tunnel liner (and preferably not a wellbore) surface.

In a second aspect of this tenth example embodiment, the settable composition is pumped through a hose and a nozzle whose position is controlled by a processor.

In a third aspect of this tenth example embodiment, the settable composition having the mixed first and second components of the redox system is extruded onto previously extruded settable composition using a 3D printer device.

In an eleventh example embodiment, which may be based on any of the first through tenth example embodiments described above, the present invention further comprises introducing a set accelerator, a set retarder, or both into the settable composition.

In a first aspect of this eleventh example embodiment, the settable composition and polymerizable component system are first mixed together, pumped through a hose, and the set accelerator, set retarder, or both are injected into the hose or hose nozzle, and preferably before the settable composition exits the hose through a nozzle.

Exemplary set accelerators include alkanolamines, aluminum hydroxysulphate, aluminum hydroxide, alkali aluminates, alkali silicates, and more preferably alkali free accelerators.

An exemplary accelerator for hydraulic cements is taught in US Publication Serial No. 2017/0073267 of Gallucci et al. (Sika Technology AG), which taught that the accelerator could comprise at least one phosphoric acid ester of a multivalent alcohol and at least one calcium compound. For example, phosphoric acid ester could be a partial ester of a polyhydric alcohol, such as a monoester of a di- or trihydric alcohol, more preferably of glycerol (e.g., glycerol phosphate or disodium glycerol phosphate or a hydrate thereof). The calcium compound could be an inorganic and/or organic calcium salt, such as calcium oxide and/or calcium hydroxide.

In a twelfth example embodiment, which may be based on any of the first through eleventh example embodiments described above, the present invention provides a method wherein, in step D, the settable composition mixed with the polymerizable component system having first and second components of the redox system is extruded onto previously extruded settable composition using a 3D printer device.

In a first aspect of this twelfth example embodiment, the second component of the redox system is injected into a hose or nozzle through which the settable composition and polymerizable component system are being flowed together.

In a second aspect of this twelfth example embodiment, an accelerating agent for the settable composition and the second component of the redox system are injected into a hose or nozzle through which the settable composition and polymerizable component system are being flowed together.

In a third aspect of this twelfth example embodiment, the settable composition, polymerizable component system, or both, further comprise a colorant, pigment, or dye.

Figure 2:
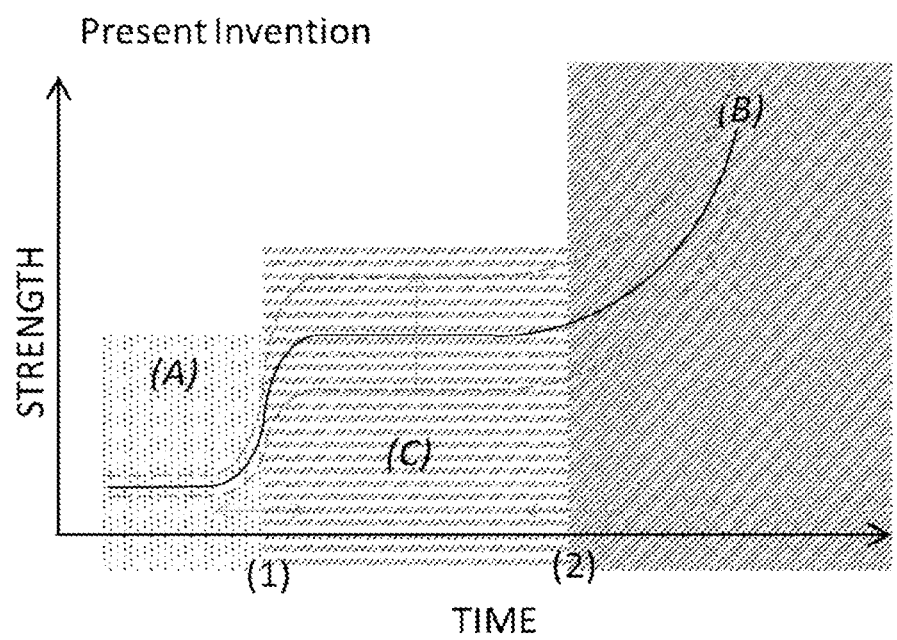
FIG. 2 is a graphic illustration of the strength evolution curve of a cementitious composition made in accordance with the present invention, wherein the cementitious composition comprises polymerizable components, which, upon activation using a redox pair, establish an in-situ gel-like structure that provides an extended window of workability or malleability (illustrated in the shaded area designated C) between a high flow-ability phase (illustrated in the shaded area designated A) and a setting phase (illustrated in the shaded area designated B) within the hydrating matrix of the cementitious composition.

In a fourth aspect of this twelfth example embodiment, the settable composition mixed with the polymerizable component system having first and second components of the redox system is extruded onto previously extruded settable composition using a 3D printer device such that the setting window (See e.g., example illustrated at (C) of FIG. 2) overlap to prevent formation of cold joints.

In a thirteenth example embodiment, which may be based on any of the first through twelfth example embodiments described above, the present invention provides a method further comprising adding at least one further chemical admixture to the settable composition.

In a first aspect based on the thirteen example embodiment, the chemical admixture may be chosen from plasticizers, superplasticizers, viscosity modifiers, accelerators, retarders, air entrainers, air detrainers, shrinkage reducing agents, fibers, grinding aids, strength enhancers, rheology control agent, permeability reducing admixtures, finishing aids, corrosion inhibitors, curing compounds, water repellents, clay mitigation agents, or mixture thereof.

In a second aspect based on the thirteenth example embodiment, the admixture is a strength enhancing admixture chosen from an alkali or alkaline earth metal salt, an alkanolamine, or combination thereof.

As previously mentioned, further exemplary embodiments may contain two or more superplasticizing admixtures used in combination.

In a fourteenth example embodiment, which may be based on any of the first through thirteenth example embodiments described above, the present invention provides a method wherein, in step (D), the mixture of the settable composition and polymerizable component system, along with the mixed first and second redox pair, are flowed into a concrete formwork to form a first layer of an integrated concrete slab system; and, while the first layer is still in a plastic state, casting onto the first layer a second layer comprising concrete comprising fibers chosen from polymer, metal, or both, to achieve a concrete slab structure. Preferably, although not necessarily, the second layer can bond with the first layer while the first layer is in a plastic state, thereby to form an integrated region which strongly bonds the first and second concrete layers together.

In a first aspect of the fourteenth example embodiment, first and second layers are arranged such that the stiffness, strength or both are intentionally different. This may be accomplished through difference in the mix components, or the timing of the placements.

In a second aspect of the fourteenth example embodiment, the first and second layers are arranged such that the top layer has a lower stiffness than the bottom layer in order to reduce the stresses on the total combined layers. Because the top layer is exposed to drying while the bottom layer is not, the largest stresses are at and/or within the top layer.

A method for providing an integrated concrete slab having minimal curl was taught in U.S. Pat. No. 7,968,178 of Scurto and Face, owned by the common assignee hereof. In accordance with this patent, it was disclosed that an integrated concrete slab could be made by overlaying concrete having approximately 3-9 pounds of stretchable (e.g., polymer) fibers mixed in each cubic yard, could be overlaid onto (and thus become partially integrated with) a portion of concrete in a previously cast first layer that contained either no fibers or relatively few fibers mixed therein.

The present inventors believe that the use of a polymerizable component system in the first layer, along with the redox pair, will increase early strength and lengthen the plasticity time window of the first layer, to help the contractor ensure that the second layer of concrete (with fibers and optionally anti-shrinkage and/or crack-control admixtures) can be laid onto the first layer while it is in a plastic state, so as to ensure the integration of the first and second layers that comprise the integrated concrete slab structure.

In a fifteenth example embodiment, which may be based on any of the first through fourteenth example embodiments described above, the present invention provides a method for achieving non-hydration strength in a cementitious composition used as building material in a 3D printing operation, comprising:
- (A) providing a settable composition comprising a hydratable cementitious binder, a plurality of aggregates, and water in an amount effective to establish a hydrating cementitious matrix:
- (B) providing a polymerizable component system comprising (i) an ethylenic monomer having at least one hydrophilic group, (ii) at least one cross-linker monomer; and (iii) a first component of a two-component reduction-oxidation ("redox") system, to establish a cross-linking system within the hydrating cementitious matrix;
- (C) mixing together the settable composition, polymerizable component system, and a second component of the redox system, such that the first and second components of the redox system become mixed together to activate cross-linking of the polymerizable component system within the hydrating cementitious matrix of the settable composition; and
- (D) flowing the mixture from step C through a hose and a nozzle whose position and movement, along with emission through the nozzle of the mixed settable composition and polymerizable component system are controlled by a processor, whereby the polymerizable component system undergoes polymerization within the hydrating settable cementitious matrix, and increases compressive strength, elastic modulus, or both compressive strength and elastic modulus of the settable composition, before the binder sets;

extruding through the nozzle a first layer comprising the settable composition and component system undergoing polymerization; and extruding through the nozzle a second layer of settable composition and component system undergoing polymerization onto the first layer to build a three-dimensional structure.

Figure 4:
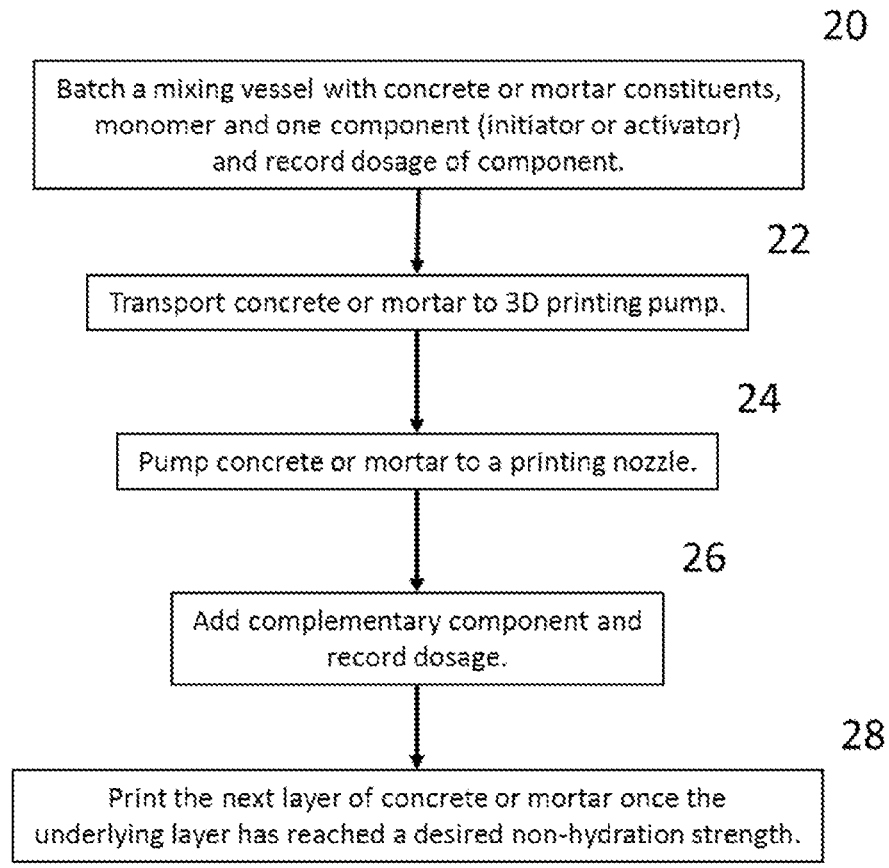
FIG. 4 is a graphic illustration of an exemplary method of the present invention for initiating polymerization of a monomer and initiator or activator in a concrete mix used in an additive manufacturing process such as 3D printing applications.

FIG. 4 outlines another exemplary method of the present invention involving 3D printing of a concrete or mortar. A load of concrete or mortar is first batched into a mixing vessel with typical concrete or mortar components (block 20). This can be accomplished for example, in a mixer truck with a mixer drum, a stationary mixer or alternatively on-site in a portable mixer (which may involve pre-bagged materials). In one preferred embodiment, the concrete or mortar is mixing in a mixer truck equipped to measure and adjust the rheology (see e.g. U.S. Pat. No. 8,020,431; 8,764,272 or 8,818,561). In this manner, a consistent initial rheology can be achieved for the 3D printing application. This initial rheology is critical as it can minimize variations to the concrete during pumping to and through the 3D printer. For example, if the initial rheology varies (in yield stress, viscosity, thixotropy, etc.), the pump settings which were optimal for one rheology might be suboptimal for the current deviated rheology. This can cause issues such as segregation, high pumping pressure, clogged pumps, etc. Thus, using a mixer truck that is capable of managing the rheology can be highly beneficial to the 3D printing process. Along with the typical concrete or mortar components, one of either the activator or initiator along with the monomer is added while the dosage is 3 recorded. In one preferred embodiment, the monomer is added with the cement. In a more preferred embodiment, a cross-linker is also added with the monomer. An activator can also be added at this time. A preferred system includes an 2-Acrylamido-2-methylpropane sulfonic acid (AMPS) monomer, an N,N-methylene bis(acrylamide) ("bis-AAm") cross-linker and potassium persulfate (KPS) initiator. In block 22, the concrete or mortar is transported to a pump that will deliver the concrete or mortar to a nozzle head for deposition or extrusion (block 24). The pump would most preferably be set up to provide a continuous amount of material to the nozzle (using for example a progressive cavity pump). In one preferred embodiment, the pump may be instrumented with pressure sensors or other sensors that monitor the performance of the pump. Based on how the material affects the performance of the pump (e.g. the material is stiffening and causing an increase in the pump pressure), a signal or alert can be sent back to the mixer truck to adjust the concrete rheology to maintain the rheology of the material passing through the pump. Thus, the instrument pump acts as a secondary input to the rheology management system. Once the material is pumped to the nozzle, the nozzle may be controlled in a number of ways including, for example, a gantry system or robotic arm. In this nozzle, or hose or tube leading to the nozzle, the complementary component (either the initiator or the activator that was not added in block 20) can be added and recorded (block 26). In one preferred embodiment, the complementary component is added to the hose or tube leading to the nozzle and passes through a static mixer before reaching the nozzle. In another preferred embodiment, the nozzle itself contains a static mixer. A preferred composition includes a sodium bisulfite activator. In another embodiment, two pumps may be used to transport two separate streams of concrete or mortar to a common nozzle. This allows each to have a fully mixed concrete or mortar; one with the activator, the other with the activator. Monomer can be present in one or both streams. In this case, the hose before the nozzle, or the nozzle itself can comprise a static mixer to ensure all components from the separate streams are combined homogeneously before extrusion. Dosages of the monomer, initiator and activator (and cross-linker) can be adjusted in real-time based on both changes in rheology and the time between successive layers are deposited. The changes in rheology can either be determined in the mixer truck (e.g. through a Verifi® system), determined in the pump, or even determined from sensors attached to the hose or nozzle. In addition to rheology, changes in hydration or temperature can also be monitored to adjust dosing of the non-hydration system. In fact, a 3D printing system comprising feedback sensor systems from a mixer truck (e.g. Verifi® system), the pump (e.g. pressure monitoring system) and the nozzle (e.g. ultrasonic flow sensor, ultrasonic air sensor, pressure sensor) would provide a large improvement over current 3D printing processes even without use of the present novel settable composition. By connecting not only the evolution of rheology and hydration over time through the different points in the 3D printing process (i.e. from mixer truck to pump to nozzle), but also the change in rheology and hydration as a result of the different processing aspects (i.e. mixing within the rotating mixer drum, squeezing and confinement during pumping and extrusion through the nozzle), adjustments can be made to both chemical admixtures (including water) additions as well as processing parameters (e.g. mixer drum speed, pumping flow rate, nozzle position and velocity during the 3D printing process). This same system can also provide similar benefits to shotcrete, where rheology and hydration control are desirable.

The increase in non-hydration strength can be used to either print higher layers, or decrease the time between layers, or a combination of both. In a further embodiment, the use of a sucrose—calcium hydroxide system can be used in addition to the monomer—activator system (as described in US 2017/0073267) to help further control hydration. The 3D printing system can be programmed to start printing the next layer as soon as the non-hydration strength reaches a given level sufficient to hold at least the next deposited layer [block 28]. Dosages of the in-situ polymerization chemicals can be increased if more than one layer is to be added. Alternatively, dosages of both the in-situ polymerization components as well as accelerators can be balanced such that the concrete or mortar of a printed layers more than a single layer below the current layer begins to set.

Figure 5:
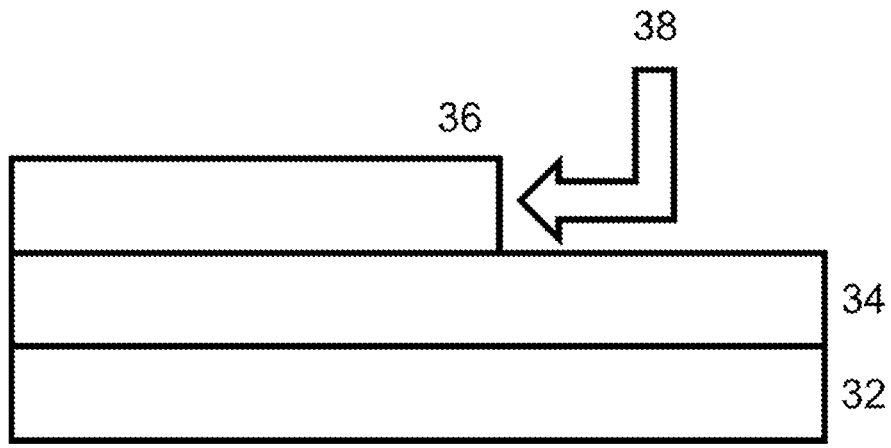
FIG. 5 is a graphic representation of three successive cementitious layers as extruded or placed using a continuous 3D printed concrete or mortar application in accordance with the present invention.

As shown in FIG. 5, successive layers can be applied during 3D printing or other additive operation, to the extent that the base layer (32), and successive layer(s) (34), and achieve sufficient green strength to support the weight of all successively added layers (e.g., 36). For example, the malleability window of base or preceding layer (32) should overlap slightly the malleability window for successive layer (34). The material forming base layer 32, due to the presence the polymerization system will develop sufficient green strength for supporting the addition of successive layer (34); and both layers will be in a plastic state so that preferably they will become bonded and remain bonded while both (32/34) are hardening. Once these two layers are integrated (32/34), the setting of the bottom layer (32) can begin (and this can be controlled by the presence of set accelerator). The window of malleability for the added layer (34) needs to remain open so that the next successive layer (34) can be added as shown at 38 which designates the 3D printer nozzle which is not shown. Upon addition of the third layer 36, the green strength of layer 34 should be sufficient to sustain the weight of the third layer 36; while the base or lower layer (32) should be sufficient to sustain the combined weight of both upper layers 34 and 36. Hence, the 3D printing of an article that comprises several layers (e.g., 32/34/36) can be accomplished quickly and efficiently by controlling the malleability window of layers using the polymerizable system of the present invention.

As one needs a base or preceding layer (e.g., 32) to achieve a certain minimum green strength before overlaying a successive layer (e.g., 34), after which the base or preceding layer (32) can begin to enter into the hardening phase, the ability of the present invention to control both edges of the "malleability window" in time (see e.g., the shaded region designated as C between (1) and (2) in FIG. 2, will greatly enhance additive processes such as 3D printing. In other words, successive added layers can be extruded or "printed" more rapidly as lower layers can support more weight as they polymerize and then set/harden; and, hence, there is decreased risk of having cold joints formed between successively added layers.

In a sixteenth example embodiment, the invention provides an admixture components package for establishing a hydrating cementitious composition having non-hydration polymerization components, the package comprising:
(A) a settable composition comprising a hydratable cementitious binder, a plurality of aggregates, and water in an amount effective to establish a hydrating cementitious matrix:
(B) a polymerizable component system comprising (i) an ethylenic monomer having at least one hydrophilic group, (ii) at least one cross-linker monomer; and (iii) a first component of a two-component reduction-oxidation ("redox") system, to establish a cross-linking system within the hydrating cementitious matrix;
(C) a second component of the two-component redox system; and
(D) a set accelerator for accelerating setting of the settable composition; wherein the second component of the two-component redox system is packaged separately from the polymerizable component system. The set accelerator can, for example, be packaged with any of the components.

In a first aspect of the sixteenth example embodiment: second component of redox pair and set accelerator are packaged separately from the settable composition and polymerizable component system.

In a second aspect of the sixteenth example embodiment: second component of redox pair is packaged with the settable composition (minus water); and set accelerator is packaged with the polymerizable component system.

In a seventeenth example embodiment, which may be based upon any of the first through sixteenth example embodiment above, the present invention provides method and settable composition having the following preferred component ranges:

| Component | Preferred range | More Preferred range | Most Preferred range |
|---|---|---|---|
| Hydratable cementitious binder | 5%-90% by total mass* | 8%-60% by total mass* | 10%-40% by total mass* |
| Ethylenic monomer having hydrophilic group | 0.1-30% by combined weight of cementitious binder and water | 0.3-15% by combined weight of cementitious binder and water | 0.5-8% by combined weight of cementitious binder and water |

*The cementitious binder range is based on percentage total mass (which includes Portland cement and any supplementary cementitious materials, water, and aggregates).

While the invention is described herein using a limited number of embodiments, these specific embodiments are not intended to limit the scope of the invention as otherwise described and claimed herein. Modifications and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage dry weight unless otherwise specified.

EXEMPLIFICATIONS

Example 1

Hydratable cement mortar samples were prepared using incremental amounts, e.g., 2%, 4%, and 6% solids based on weight of cement material (% s/cm), of 2-acrylamido-2-methylpropane sulfonic acid ("AMPS") monomer and N,N'-methylene bis(acrylamide) ("bis-AAm") cross-linker monomer in a weight ratio (AMPS/bis-AAm) of 90/10.

The cement mortar mix design included cement, water, and a sand (EN-196) in a weight ratio (sand/cement/water) of 1350/533/240 grams (w/cm=0.45), and also including a polycarboxylate dispersant polymer at 0.06% s/cm based on weight of cement.

The polymerization initiator system employed was a potassium persulfate ("KPS") initiator (0.026% s/cm) with a sodium bisulfite activator (0.012% s/cm) to form the redox pair.

Mixing procedure was as follows: 1) sand, water, AMPS, bis-AAm, and KPS were added into a Hobart mixer bowl and mixed for 2 minutes; 2) cement was added to the bowl, and mixed for an additional 2 minutes; and 3) sodium bisulfite was then added to the mix, and the cement mixture was vigorously hand-mixed for 15 seconds. Thereafter, penetrometer testing began (at time zero) on the surface of the material.

A penetrometer typically used to determine concrete set times was used to determine the pressure required to penetrate the mortar for a fixed distance (1 inch). Hardening started within a minute or two, depending on system and mixing intensity. The KPS initiator did not initiate polymerization until the activator (sodium bisulfite) was added at room temperature.

As will be shown in the following example, the order of addition of the KPS initiator and sodium bisulfite activator (forming the redox pair) can be reversed. For example, the monomers and activator can first be mixed together and the initiator (e.g. KPS) added later in time but mixed in before the material is placed (e.g., poured, cast, injected). This flexibility in order is particularly important for situations wherein the cement or aggregates contains a potential activator, such as an amine, particularly a tertiary amine. In addition, the monomer can be added along with either the initiator or activator.

It also should also be noted that the mortar does not stiffen while the mortar is under agitation. The stiffening starts only after the mortar becomes stationary. Consistent mixing after the addition of activator is important to compare the penetration test results.

Figure 6A:
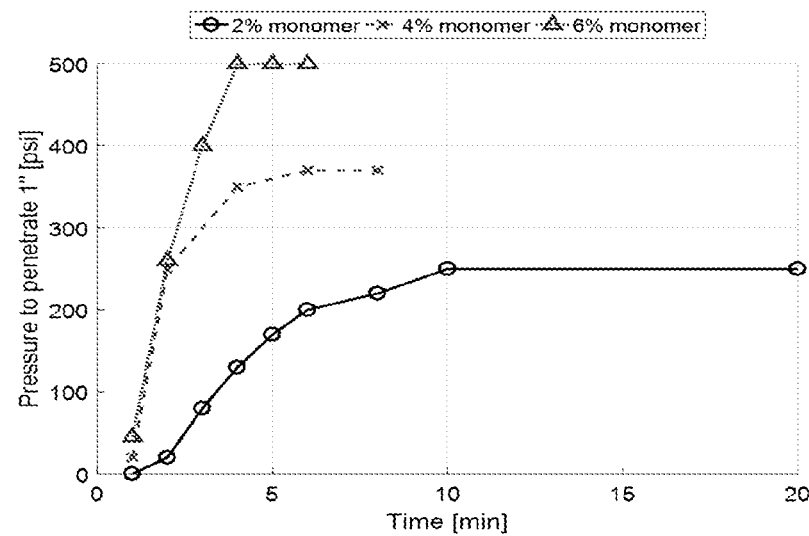
FIG. 6A is a graphic illustration of compressive strength, in terms of penetrometer values, as a function of time of a hydratable cementitious composition having different amounts of polymerizing monomer content, in accordance with the present invention.
Figure 6B:
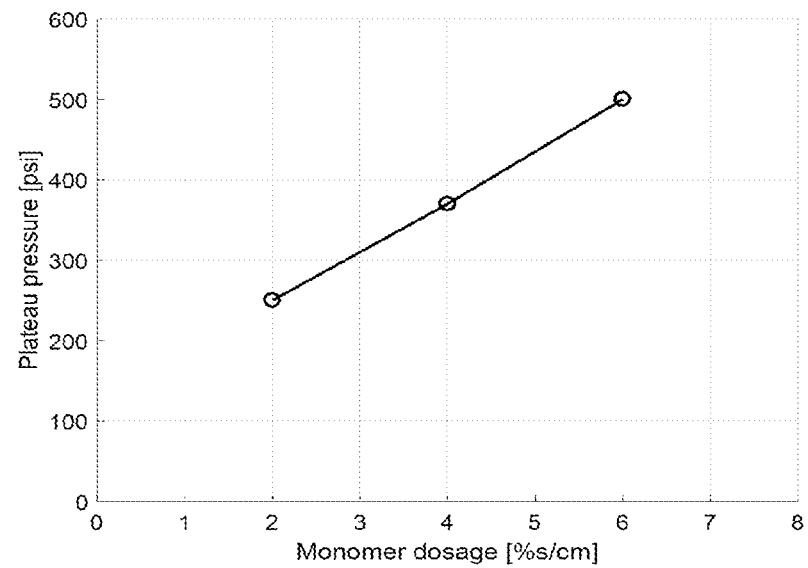
FIG. 6B is a graphic illustration of the plateau pressure, indicated in pounds per square inch, of a hydratable cementitious composition as a function of monomer dosage indicated as percentage solids based on weight of cement, according to the present invention.

In FIG. 6A, the mortar strength development (as confirmed through penetrometer readings) is shown, while in FIG. 6B, the relationship between the monomer content and plateau compressive strength is shown. Note that there is a linear relationship between the monomer content and plateau compressive strength.

Example 2

Cement mortar mixes using different monomers were prepared in a manner similar to that described above in Example 1.

In this example, two different exemplary compositions of the present invention were tested: AMPS and acrylic acid (AA); and AMPS and N,N'-dimethylacrylamide (DMA). The materials and mixing procedure were similar to that described above in Example 1, except the types, combinations, and relative amounts of the monomers are slightly varied: (1) AMPS:AA:bis-AAm=1.8:2.0:0.2% s/cm, (2) AMPS:DMA:bis-AAm=1.8:2.0:0.2% s/cm, and (3) AMPS:DMA:bis-AAm=0.9:0.1:3.0% s/cm.

The same KPS/sodium bisulfite redox pair was used for each of the three mixes.

Figure 7:
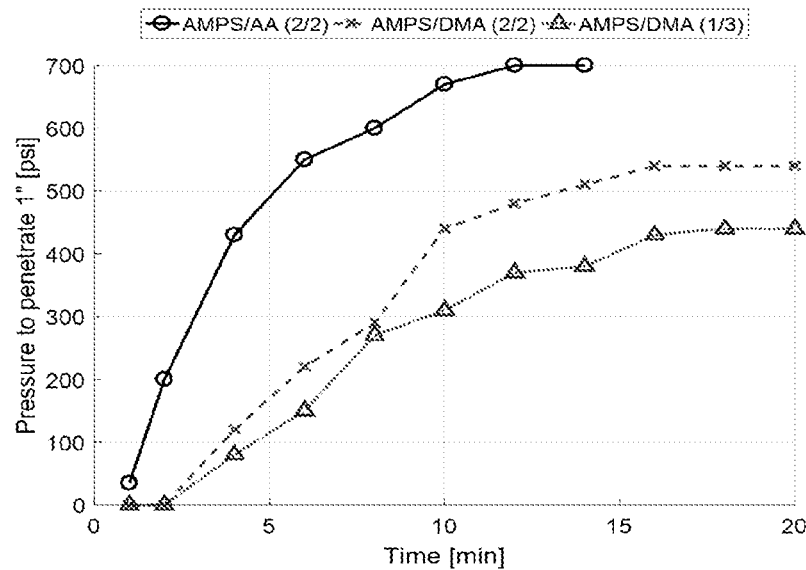
FIG. 7 is a graphic illustration of compressive strength, indicated in terms of penetrometer values, of a hydratable cementitious composition may be adjusted by using various polymerizable monomer combinations, in accordance with the present invention.

In FIG. 7, the penetration test results show that the AMPS combination with polymerizable monomers such as AA or DMA results in equal or better plateau compressive strengths as the AMPS system of Example 1 with comparable dose.

Example 3

A cement mortar mix using the same AMPS/bis-AAm system in Example 1 was tested again, this time with the addition of calcium nitrate at 1.42% s/cm. The same KPS/sodium bisulfite redox pair was also used. The mortar mix were prepared in the same manner as Example 1.

Figure 8:
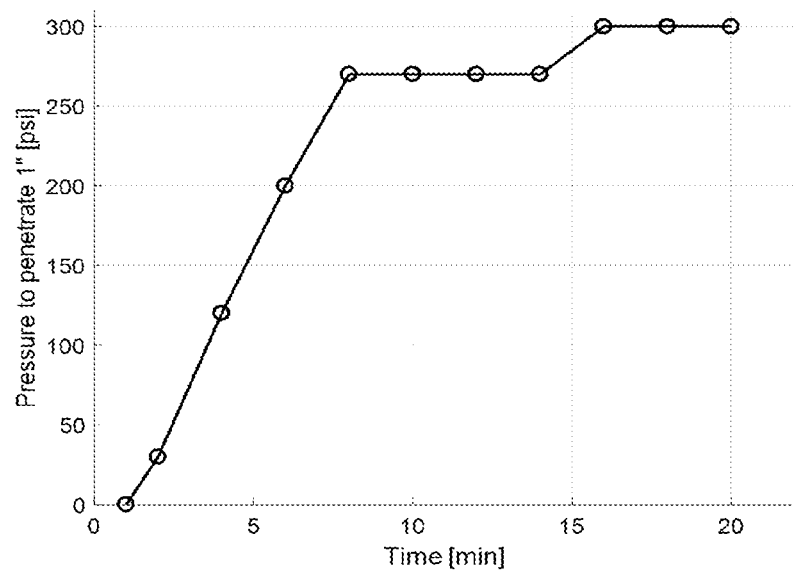
FIG. 8 is a graphic illustration that compressive strength, indicated in terms of penetrometer values, of a hydratable cementitious composition having polymerizable monomers in accordance with the present invention may be adjusted by using a set accelerator such as calcium nitrate which also enhances later age strength of the concrete, serving to define earlier onset and higher strength value of the strength plateau (which begins just after the passing of the 15 minute mark).

As shown in FIG. 8, the addition of calcium salt enhanced the plateau compressive strength compared to the respective mix in Example 1. It should be noted that the addition of calcium or other alkaline salts also increases the later age strength that originates from cement hydration.

Example 4

A cement mortar mix using the same AMPS/bis-AAm system in Example 1 was tested, but this time an amine activator (reducing agent) was used instead of sodium bisulfite. In this test, bis[2-(N,N-dimethylamino)-ethyl] ether, was employed as activator. The mortar mixes were prepared in the same manner as Example 1, except that the order of the activator (in this case the amine) and the initiator (KPS) was switched. Thus, in this example, the initiator, instead of activator, was mixed into the cementitious composition just before its placement.

Figure 9:
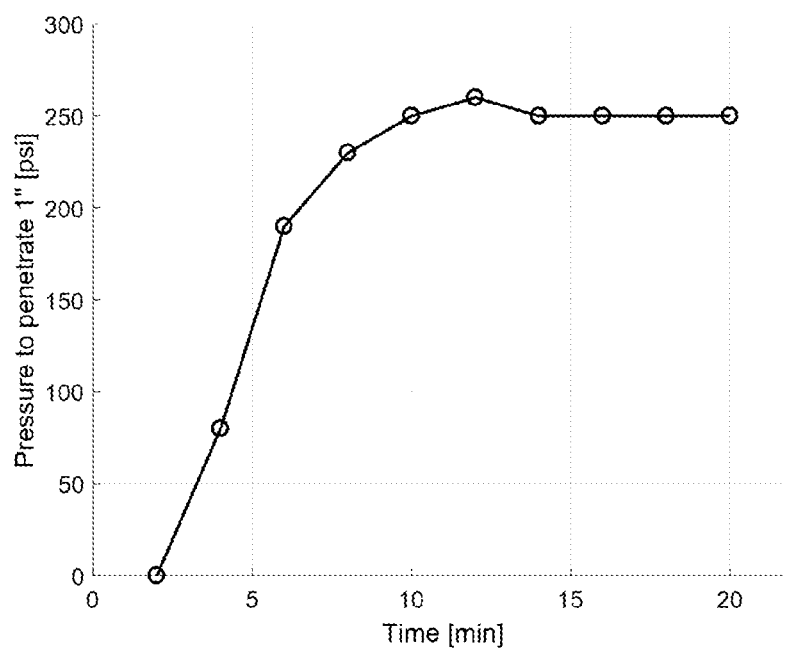
FIG. 9 is a graphic illustration of compressive strength, in terms of penetrometer values, of a hydratable cementitious composition having polymerizable monomers in accordance with the present invention, although using a different redox pair.

As shown in FIG. 9, comparable strength development was observed with KPS-amine redox system as compared to Example 1. This confirms not only that amine chemistries can work as activators, but also that the order of activator and initiator can be switched and still achieve a non-hydration strength development. This may be preferred, for example, if the activator or initiator is a water insoluble chemical, and would be most effectively mixed into the cementitious mixture at the batch plant. A water-soluble chemical (either the activator or initiator) could then be added as a solution into the concrete mixer drum through a systems such as Verifi®. The ability to add in either order helps broaden the chemistries that are practically useful for the present invention.

Example 5

Two concrete mixes were made, each containing 564 pounds per cubic yard lbs/yd$^3$ of cement, 1700 lbs/yd$^3$ of stone, 1425 lbs/yd$^3$ of sand, 300 lbs/yd$^3$ of water, 4.0 ounces per hundred pounds of cementitious materials (oz/cwt) of ADVA® 140M, a high-range water reducer (HRWR) and 0.25 oz/cwt of DAREX® II Air Entraining Admixture (available from GCP Applied Technologies Inc., Cambridge, MA, USA).

For MIX 1, 1.8% s/cm of AMPS monomer, 0.2% s/cm of a bis-AAm cross-linker, and 0.26% s/cm of KPS were added with the cement. REF 1, the reference mix, did not include any additional chemicals. Both concretes were mixed according to the following protocol: at high speed, the stone, sand and 80% of the water was mixed for 2 minutes; cement was added and mixed in at high speed for 2 minutes; the HRWR was added and mixed in at high speed for 2 minutes; the mixer was turned off and the concrete was left to rest for 3 minutes and; the mixing resumed at high speed for 3 minutes. For MIX 1, 0.2% s/cm sodium bisulfite was added after the rest period.

After mixing, a portion of each concrete was tested for slump (according to ASTM C143-15a), air content (according to ASTM C231-17a), compressive strength (according to ASTM C39-17b), and a modified Proctor test similar to one developed by Abel and Hover ("Field study of the setting behavior of fresh concrete" in *Cement, Concrete and Aggregates*, Vol. 22, pp. 95-102, 2000), where the force required to penetrate a concrete surface to a depth of ¼" with a 1" diameter disc was recorded.

Figure 10A:
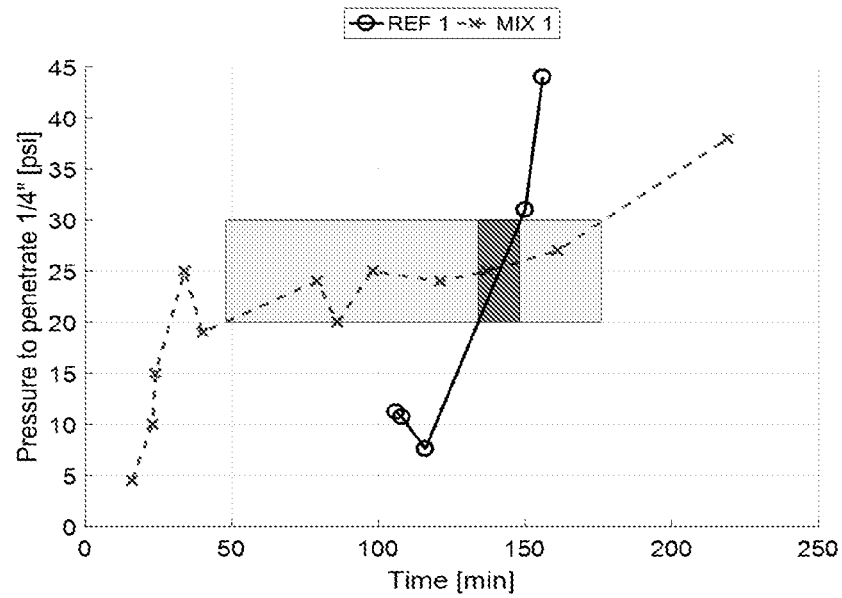
FIG. 10A is a graphic illustration of very early compressive strength, in terms of penetrometer values, overtime of a control hydratable cementitious composition not having polymerizing monomer system as illustrated with solid line (REF 1) compared to a hydratable cementitious composition having polymerizing monomers in accordance with the present invention as illustrated by the discontinuous line (MIX 1). The dark shaded box suggests that the period of malleability for the composition of REF 1 is much shorter in time compared to the lighter shaded box which illustrates a very wide period of malleability for MIX 1.

As shown in FIG. 10A, the penetration results from the modified Proctor test show the difference between a concrete produced using an exemplary method and composition of the present invention to a reference concrete. MIX 1 experienced an immediate increase in strength as evidence by the increase in penetration values, and it maintained a strength plateau as evidenced by the elevated penetration pressure around 25 psi as shown in the lightly shaded area of FIG. 10A.

On the other hand, the reference mix, REF 1, did not reach the same strength (penetration value of 25 psi) until nearly 75 minutes after this was attained by MIX 1.

Furthermore, the window for REF 1 where the penetration pressure was between 20 and 30 psi was much shorter than for MIX 1 as shown in the darkly shaded area.

This highlights the advantage of the present invention: because one can see from these results that finishing activities can begin earlier, because, more importantly, the window of finishing is extended significantly.

Figure 10B:
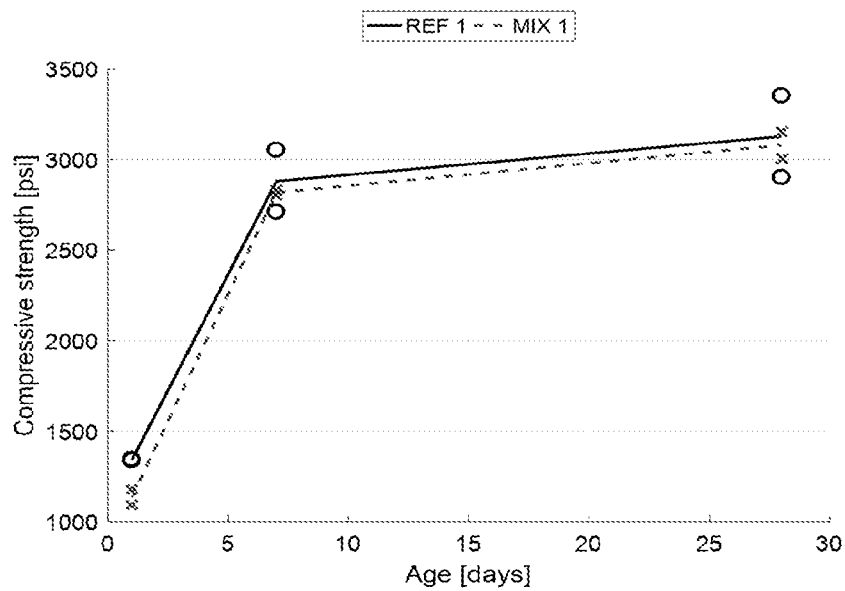
FIG. 10B is a graphic illustration of later age compressive strength (penetrometer values) for a reference slab mix design (without polymerizing monomers) and for an exemplary composition of the present invention wherein monomers are polymerized within a hydrating cementitious matrix composition.

The strengths for each mix are shown in FIG. 10B. Although the strength for MIX 1 was less than REF 1, at 28 days, the strengths were comparable. The use of accelerators (e.g. calcium nitrate) can help to improve the 1- and 7-day strengths, if desired.

Example 6

In this example, six concrete mixes were made, each containing 500 pounds per cubic yard lbs/yd³ of cement, 1800 lbs/yd³ of stone, 1425 lbs/yd³ of sand, 300 lbs/yd³ of water and 4.5 oz/cwt of WRDA® 64, a low-range water reducer (LRWR). For mixes MIX 2-4, 1.8% s/c of an AMPS monomer, 0.2% s/c of a bis-AAm cross-linker and 0.26% s/c of KPS were added with the cement.

For mixes designated as REF 2-4, no additional chemicals were added.

All concretes were mixed according to the protocol of Example 5. For the mixes MIX 2-5, 0.2% s/c sodium bi-sulfite was added after the rest period. After mixing, a portion of each concrete was tested for slump (according to ASTM C143-15a), air content (according to ASTM C231-17a), while the remaining concrete was poured into a 2-foot by 3-foot by 8-inch slab, and then the surface was screed and hand-floated. Three mixes were made using exemplary methods of the invention while three mixes were used as a reference. The three slabs per mix design combined to provide a larger area over which to perform a foot print test, which allowed more foot prints to be imprinted within a given time period. According to ACI 302, the concrete should be finished when the depth reaches ¼".

Figure 11:
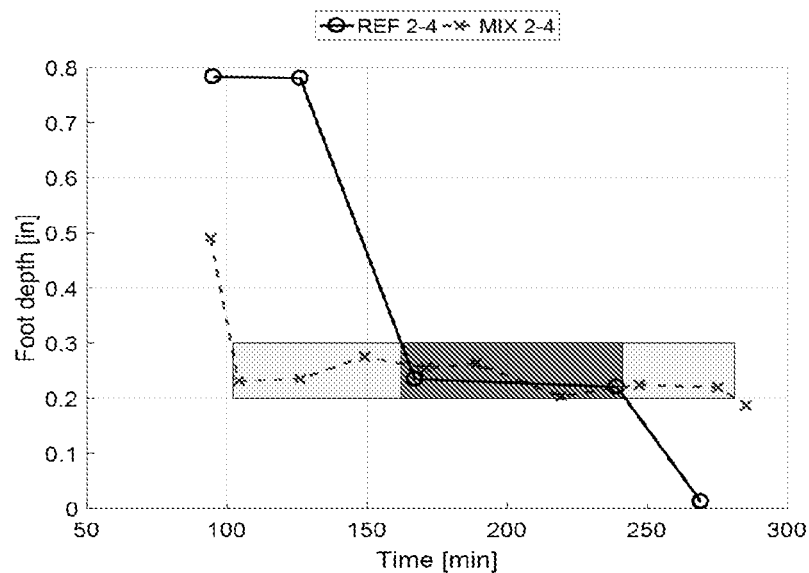
FIG. 11 is a graphic illustration showing footprint tests for a reference slab mix design (not having polymerizing monomers) as illustrated by solid lines and designated by "REF 2-4"; and for hydratable cementitious compositions containing polymerizing monomers in accordance with the present invention as illustrated by discontinuous lines and designated by "MIX 2-4." The dark shaded box suggests that the period of malleability for the compositions of REF 2-4 is much shorter in time compared to the lighter shaded box which illustrates a very wide period of malleability for MIX 2-4.

As shown in FIG. 11, the depth of a footprint (created with one foot and waiting for 5 seconds), is shown versus time for each set (MIX 2-4 versus REF 2-4). For MIX 2-4, the penetration achieves and maintains a level of around ¼" for a much wider range (lightly shaded area) than REF 2-4 (darkly shaded area). Both the slumps and air contents of each were comparable (5-6" slump, 2-3% air).

Example 7

This example demonstrates that the cementitious compositions having in-situ polymerization activated by the redox pair provide benefits for additive manufacturing processes, such as layering of concrete slabs, 3D printing, and other sequential phase construction methods.

Cement pastes were produced with a w/cm of 0.4. For MIX 6-7, 0.9% s/c of an AMPS monomer, 0.1% s/c of a bis-AAm cross-linker and 0.13% s/c of KPS were added with the cement. For REF 6-7, no additional chemicals were added. MIX 6 was mixed for 1 minutes by hand and then 0.1% s/c sodium bi-sulfite was added, followed by one additional 15 seconds of mixing. REF 6-7 was mixed for 1.25 minutes total. After mixing, a 60 mL syringed was filled with approximately 40 mL of cement paste.

The cement paste was then extruded by a syringe pump dispensing 11.4 mL per minute into the shape of a square hollow prism where the length of each side was 100 mm. At least 4 layers were extruded for each mix. The structures were then allowed to cure for 1 day. After curing, the dimensions of each prism were taken: the total weight of each sample, the height of each prism corner and the width of the bottom (i.e. first layer) of each wall of the prism. Because different volumes were extruded, the average of the corner heights were normalized by the total weight of each sample. Thus, a height normalized by weight was obtained.

In this experiment, for materials well-suited for additive manufacturing, the normalized height will likely be larger than for materials not suitable. That is because materials that do not develop enough early strength to support successive layers are likely to have a wall structure that will collapse or compress under the compressive loading. However, for a suitable material, the green strength will be such that successive layers can be supported without compression of each layer. In a similar fashion, the width of each wall for the bottom layer indicates the ability of the bottom layer to support successive layers. For walls with thick widths, compression is evident due to successive layers. Thus, it is preferable to have the thinnest wall thickness possible at the bottom layer in this experiment.

Figure 12:
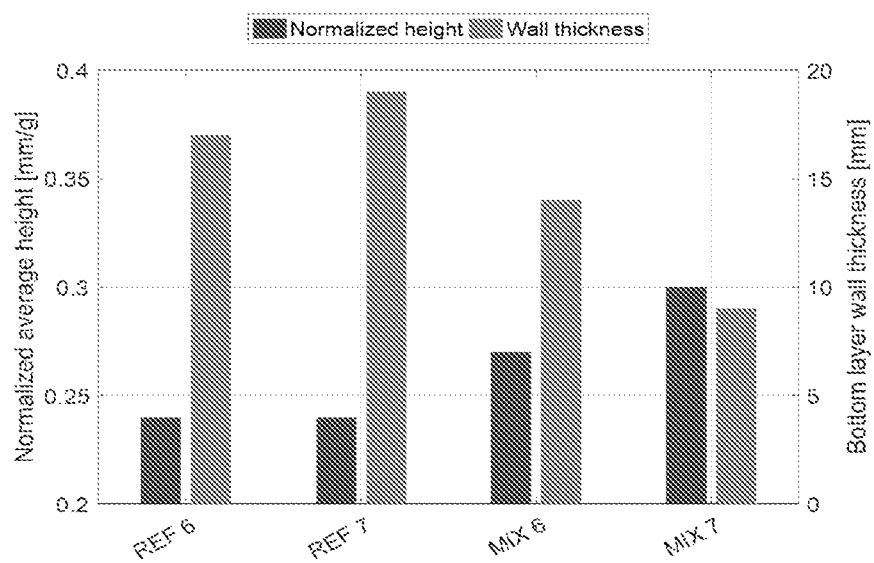
FIG. 12 is a bar graph illustration of measurements of cement structures formed by using additive manufacturing, wherein thicker walls relative to height are required when using a reference cement paste (See REF 6 and REF 7), as compared to using a cement paste having polymerizable monomers according to the present invention (See MIX 6 and MIX 7).

As shown in FIG. 12, the cementitious samples had differentiating characteristics that could be discerned using this prism analysis. The normalized heights for MIX 6-7 were measured and found to be about 12-25% higher compared to REF 6-7. Furthermore, the bottom layer wall thicknesses for MIX 6-7 were about 25 to 50% less than REF 6-7. Both of these differences indicate that the addition of in-situ polymerization can improve the additive manufacturing capabilities of hydrating cementitious compositions.

Example 8

In this example, two concrete mixes were made, each containing 716 pounds per cubic yard lbs/yd³ of cement, 874 lbs/yd³ of stone, 2042 lbs/yd³ of sand and 322 lbs/yd³ of water. For REF 7, 12.5 oz/cwt of a high-range water reducer (HRWR) available from GCP Applied Technologies under the ADVACAST® 575 product name was added; while for MIX 7, 9.3 oz/cwt of ADVACAST® 575 was added to achieve a comparable slump (around 9 inches). REF 7 also included 60.5 oz/cwt of a shotcrete accelerator available from GCP Applied Technologies under the TYTRO® SA 530 trade name. MIX 7 on the other hand, included 3.6% s/c of an AMPS monomer, 0.4% s/c of a bis-AAm cross-linker, and 0.52% s/c of KPS added with the cement. All concretes were mixed according to the procedure described in Example 5. For the mixes MIX 7, sodium bi-sulfite was added (0.4% s/c) after the rest period.

Figure 13:
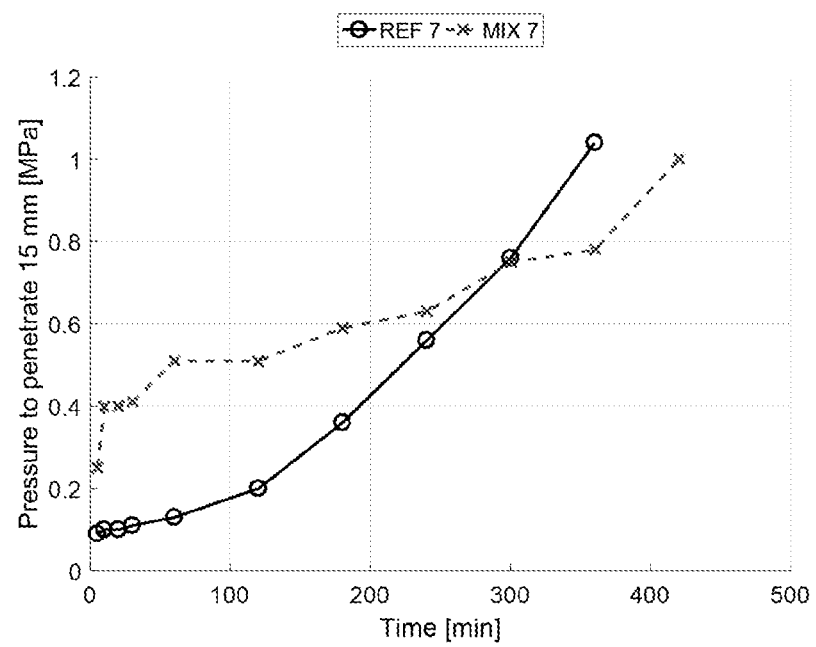
FIG. 13 is a graphic illustration which depicts hardness, in terms of penetrometer values, of "shotcrete" cement (as shown by solid line designated as "REF 7") as compared to cement having polymerizing monomers according to the present invention (as shown by discontinuous line designated as "MIX 7."

In shown in FIG. 13, the compressive strength as measured by a shotcrete penetrometer using EN ISO 14488-2 (Method A) is shown over time for both MIX 7 and REF 7. As can be seen, compared to a conventional shotcrete accelerator, an exemplary composition of the present invention achieves a higher, earlier compressive strength, with a comparable later age strength.

Example 9

Cement mortar was prepared with the same manner as Example 1. In this example, calcium carbonate powder ($CaCO_3$) was added to densify the mortar. The cement mortar mix design consisted of, cement, $CaCO_3$ powder, CA-CB-03-P (American Elements, CA, USA), water, and a sand (EN-196) in the weight ratio (sand/cement/$CaCO_3$/water) of 1350/533/267/240 grams (w/powder=0.33, w/cm=0.45) with polycarboxylate dispersant polymer at 0.35% of the total powder. A sodium hydroxide was also added to the mortar. The polymerization initiator system employed was a potassium persulfate (KPS) initiator (0.026% s/cm) with a sodium bisulfite activator (0.012% s/cm) to form the redox pair. Mixing procedure was as follows: 1) sand, water, 60% solution of polycarboxylate polymer (4.6 grams), and AMPS (9.59 grams) and bis-AAm (1.07 grams) were added to a Hobart mixer bowl and mixed for 1 minute, 2) cement (533 grams), $CaCO_3$ (267 grams), sodium bisulfite (1.28 grams), and sodium hydroxide powder (3.7 grams) were added to the Hobart mixer bowl, and mixed for 3 minutes; 3) stop the mixing and rest for 3 minutes; 4) re-start mixing for 1 minute; 5) KPS was added to the bowl, and mixed for another 1 minute; after which, mortar cubes for compressive strength tests were prepared.

The 1-day mortar cube compressive strength was 3630 psi. The compressive strength was 3470 psi without sodium hydroxide. A 1-day cube strength of reference mortar without calcium carbonate and sodium hydroxide was 1540 psi with total AMPS and bis-AAm monomer content of 2% on cement.

Example 10

Cement mortar was prepared in the identical manner as Example 9 except that the calcium carbonate powder ($CaCO_3$) used was grounded limestone powder, PULPRO™ White #10 (Omya North America) and polycarboxylate dispersant dosage was 0.15% of the total powder (2 grams of 60% solution). The 1-day mortar cube compressive strength was 3280 psi. The compressive strength was 2680 psi without sodium hydroxide.

Example 11

Four different hydratable cement mortar samples were prepared. The cement mortar mix design for each included cement, water, and a sand (EN-196) in a weight ratio (sand/cement/water) of 1350/533/240 grams (w/cm=0.45), and also including a polycarboxylate dispersant polymer at 0.06% s/cm based on weight of cement.

The first sample, STD, consisted of 1.8% s/cm of an AMPS monomer, 0.2% s/cm of a bis-AAm cross-linker, 0.12% s/cm of a sodium bisulfite activator and 0.26% s/cm of a KPS initiator. The mixing procedure was as follows: 1) sand, water, AMPS, bis-AAm, and KPS were added into a Hobart mixer bowl and mixed for 2 minutes; 2) cement was added to the bowl, and mixed for an additional 2 minutes; and 3) sodium bisulfite was then added to the mix, and the cement mixture was vigorously hand-mixed for 15 seconds. Thereafter, penetrometer testing began (at time zero) on the surface of the material. In this case, the sample achieved a plateau strength of 270 at 25 minutes.

The second sample, PREMIX included the same constituents as the first sample, STD, but the mixing procedure was modified to add all components up front. In this case, after 25 minutes, no strength was achievable; thus demonstrating that adding the activator and initiator separately is a key feature of the present invention.

The third sample, POLY, replaced the AMPS/bis-AAm/redox system with a linear polymer form of AMPS. In this case, after 25 minutes, no strength was achievable; thus demonstrating that cross-linking the in-situ polymers is a key feature of the present invention.

The present invention is described herein using a limited number of illustrative embodiments not intended to limit the scope of the invention as otherwise described and claimed herein.

What is claimed is:

1. A method for achieving non-hydration strength in a cementitious composition, comprising:
   (A) providing a settable composition comprising a hydratable cementitious binder, a plurality of aggregates, and water in an amount effective to establish a hydrating cementitious matrix;
   (B) providing a polymerizable component system comprising (i) an ethylenic monomer having at least one hydrophilic group, (ii) at least one cross-linker monomer;
   and (iii) a first component of a two-component reduction-oxidation ("redox") system, to establish a cross-linking system within the hydrating cementitious matrix;
   (C) mixing together the settable composition, the polymerizable component system, and a second component of the redox system such that the first and second components of the redox system become mixed together to activate cross-linking of the polymerizable component system within the hydrating cementitious matrix of the settable composition; and
   (D) flowing the mixture from step (C) through a nozzle, into a concrete formwork or mold, or along a chute and into a concrete formwork or mold, whereby the polymerizable component system undergoes polymerization within the hydrating settable cementitious matrix, wherein
   the mixing of the settable composition of step (A) and the polymerizable component system of step (B) is accomplished using a batch mixer or continuous mixer, and the second component of the redox system of step (C) is introduced into the settable composition after the mixing of the settable composition with the polymerizable component system, the method increases the non-hydration strength before setting of the cementitious composition begins; and the ethylenic monomer having at least one hydrophilic group is 2-acrylamido-2-methylpropane sulfonic acid ("AMPS") monomer, and the cross-linker monomer is N,N'-methylene bis(acrylamide) ("bis-AAm"), and the weight ratio of AMPS:bis-AAm is from 5:95 to 99.9: 0.1.

2. The method of claim 1 wherein the hydratable cementitious binder comprises ordinary Portland cement, and optionally at least one supplemental cementitious material chosen from calcium carbonate, fly ash, slag, silica fume, calcined clay, metakaolin, limestone, and mixtures thereof.

3. The method of claim 2 wherein the concrete is flowed into formwork or mold chosen from flooring slab, vertical column, wall, or a concrete masonry unit.

4. The method of claim 1 wherein the nozzle is a shotcrete nozzle for spray application of shotcrete against a substrate, a nozzle at the end of a hose for pumping concrete from a pump mixer to an application point on a construction site, or a nozzle controlled by a processor for printing sequential add-on layers in a three-dimensional structure made of the settable composition.

5. The method of claim 1 wherein the provided ethylenic monomer having at least one hydrophilic group has a structural formula chosen from
(i) $CH_2=CR-CO-NR^1R^2$;
(ii) $CH_2=CR-CO-OR^3$;
(iii) $CH_2=CR-O-R^4$;
(iv) $CH_2=CR-R^5-O-R^4$, or mixture thereof; and
the provided cross-linker monomer having a structural formula Y'—X'—Y" wherein X' represents methylene, ethylene, poly(ethylene glycol) or ethoxylated bisphenol A, and each of Y' and Y" are independently represented by a structural formula chosen from
(i) $-CH=CR-CO-NR^1R^2$;
(ii) $-CH=CR-CO-OR^3$;
(iii) $-CH=CR-O-R^4$;
(iv) $-CH=CR-R^5-O-R^4$, or mixture thereof;
wherein R represents hydrogen or a $C_1$-$C_4$ alkyl or alkenyl group; $R^1$, $R^2$, and $R^3$ each independently represent hydrogen or a $C_1$-$C_4$ alkyl, alkenyl, hydroxyalkyl, alkylsulfonate, alkylphosphonate, alkylphosphate, or carboxyalkyl group; $R^4$ represents a $C_1$-$C_4$ alkyl, alkenyl, hydroxyalkyl, alkylsulfonate, alkylphosphonate, alkylphosphate, or carboxyalkyl group; and $R^5$ represents a $C_1$-$C_4$ alkane or alkene group.

6. The method of claim 1 wherein the redox pair comprises at least one selected from the group consisting of a persulfate, hydrogen peroxide, t-butyl peroxide, p-menthol peroxide, iron (III), cobalt (III), copper (II), bisulfite, N,N, N',N'-tetramethylene diamine, bis[2-(N,N-dimethylamino)-ethyl]ether sodium formaldehyde sulfoxilate, ascorbic acid, and sucrose or other sugars.

7. The method of claim 1 wherein, in step B, the settable composition is mixed in the rotatable mixer drum of a concrete delivery truck; and wherein, in step D, the settable composition is pumped through a hose or flowed along a chute into a placement point comprising a wooden form for a building wall or floor, a concrete slab or floor, bridge deck, rebar concrete structure, a structural column, or concrete paver unit.

8. The method of claim 1 wherein, in step D, the settable composition is pumped through a hose.

9. The method of claim 1 further comprising introducing a set accelerator, a set retarder, or both into the settable composition.

10. The method of claim 1 further comprising adding at least one further chemical admixture to the settable composition.

11. A method for achieving non-hydration strength in a cementitious composition, the method comprising the steps of:
(A) providing a settable composition comprising a hydratable cementitious binder, a plurality of aggregates, and water in an amount effective to establish a hydrating cementitious matrix;
(B) providing a polymerizable component system comprising (i) an ethylenic monomer having at least one hydrophilic group, (ii) at least one cross-linker monomer; and (iii) a first component of a two-component reduction-oxidation ("redox") system, to establish a cross-linking system within the hydrating cementitious matrix;
(C) mixing together the settable composition, polymerizable component system, and a second component of the redox system, such that the first and second components of the redox system become mixed together to activate cross-linking of the polymerizable component system within the hydrating cementitious matrix of the settable composition; and
(D) flowing the mixture from step (C) through a hose and a nozzle whose position and movement, along with emission through the nozzle of the mixed settable composition and polymerizable component system are controlled by a processor, whereby
the polymerizable component system undergoes polymerization within the hydrating settable cementitious matrix;
extruding through the nozzle a first layer comprising the settable composition and component system undergoing polymerization; and
extruding through the nozzle a second layer of settable composition and component system undergoing polymerization onto the first layer to build a three-dimensional structure, wherein the method increases the non-hydration strength before setting of the cementitious composition begins.

12. The method of claim 11 wherein the cementitious composition is used as building material in a 3D printing operation.

13. The method of claim 11 wherein the cementitious composition is used as building material in concrete requiring finishing.

14. A method for achieving non-hydration strength in a cementitious composition, comprising:
(A) providing a settable composition comprising a hydratable cementitious binder, a plurality of aggregates, and water in an amount effective to establish a hydrating cementitious matrix;
(B) providing a polymerizable component system comprising (i) an ethylenic monomer having at least one hydrophilic group, (ii) at least one cross-linker monomer; and (iii) a first component of a two-component reduction-oxidation ("redox") system, to establish a cross-linking system within the hydrating cementitious matrix;
(C) mixing together the settable composition, the polymerizable component system, and a second component of the redox system such that the first and second components of the redox system become mixed together to activate cross-linking of the polymerizable component system within the hydrating cementitious matrix of the settable composition; and (D) flowing the mixture from step (C) through a nozzle, into a concrete formwork or mold, whereby the polymerizable component system undergoes polymerization within the hydrating settable cementitious matrix, wherein the mixing of the settable composition of step (A) and the polymerizable component system of step (B) is accomplished using a batch mixer or continuous mixer, and the second component of the redox system of step (C) is introduced into the settable composition after the mixing of the settable composition with the polymerizable component system, the method increases the non-hydration strength before setting of the cementitious composition begins; and in step D, the settable composition mixed with the polymerizable component system having first and second components of the redox system is extruded onto previously extruded settable composition using a 3D printer device.

15. The method of claim 14 wherein the hydratable cementitious binder comprises ordinary Portland cement, and optionally at least one supplemental cementitious material chosen from calcium carbonate, fly ash, slag, silica fume, calcined clay, metakaolin, limestone, and mixtures thereof.

16. The method of claim 14 wherein, the provided ethylenic monomer having at least one hydrophilic group has a structural formula chosen from (i) $CH_2=CR-CO-NR^1R^2$;
(ii) $CH_2=CR-CO-OR^3$;
(iii) $CH_2=CR-O-R^4$;
(iv) $CH_2=CR-R^5-O-R^4$, or mixture thereof; and the provided cross-linker monomer having a structural formula Y'—X'—Y" wherein X' represents methylene, ethylene, poly(ethylene glycol) or ethoxylated bisphenol A, and each of Y' and Y" are independently represented by a structural formula chosen from (i) $-CH=CR-CO-NR^1R^2$;
(ii) $-CH=CR-CO-OR^3$;
(iii) $-CH=CR-O-R^4$;
(iv) $-CH=CR-R^5-O-R^4$, or mixture thereof;

wherein R represents hydrogen or a $C_1$-$C_4$ alkyl or alkenyl group; $R^1$, $R^2$, and $R^3$ each independently represent hydrogen or a $C_1$-$C_4$ alkyl, alkenyl, hydroxyalkyl, alkylsulfonate, alkylphosphonate, alkylphosphate, or carboxyalkyl group; $R^4$ represents a $C_1$-$C_4$ alkyl, alkenyl, hydroxyalkyl, alkylsulfonate, alkylphosphonate, alkylphosphate, or carboxyalkyl group; and $R^5$ represents a $C_1$-$C_4$ alkane or alkene group.

17. The method of claim 14 wherein the redox pair comprises at least one selected from the group consisting of a persulfate, hydrogen peroxide, t-butyl peroxide, p-menthol peroxide, iron (III), cobalt (III), copper (II), bisulfite, N,N, N',N'-tetramethylene diamine, bis[2-(N,N-dimethylamino)-ethyl]ether sodium formaldehyde sulfoxilate, ascorbic acid, and sucrose or other sugars.

18. A method for achieving non-hydration strength in a cementitious composition, comprising:

(A) providing a settable composition comprising a hydratable cementitious binder, a plurality of aggregates, and water in an amount effective to establish a hydrating cementitious matrix;

(B) providing a polymerizable component system comprising (i) an ethylenic monomer having at least one hydrophilic group, (ii) at least one cross-linker monomer;

and (iii) a first component of a two-component reduction-oxidation ("redox") system, to establish a cross-linking system within the hydrating cementitious matrix;

(C) mixing together the settable composition, the polymerizable component system, and a second component of the redox system such that the first and second components of the redox system become mixed together to activate cross-linking of the polymerizable component system within the hydrating cementitious matrix of the settable composition; and (D) flowing the mixture from step (C) through a nozzle, into a concrete formwork or mold, or along a chute and into a concrete formwork or mold, whereby the polymerizable component system undergoes polymerization within the hydrating settable cementitious matrix, wherein the mixing of the settable composition of step (A) and the polymerizable component system of step (B) is accomplished using a batch mixer or continuous mixer, and the second component of the redox system of step (C) is introduced into the settable composition after the mixing of the settable composition with the polymerizable component system, the method increases the non-hydration strength before setting of the cementitious composition begins; and in step (D), the mixture of the settable composition and polymerizable component system, along with the mixed first and second redox pair, are flowed into a concrete formwork to form a first layer of an integrated concrete slab system; and, while the first layer is still in a plastic state, casting onto the first layer a second layer comprising concrete comprising fibers chosen from polymer, metal, or both, to achieve an integrated concrete slab structure.

19. The method of claim 18 wherein, in step D, the settable composition is pumped through a hose.

20. The method of claim 18 wherein, further comprising adding at least one further chemical admixture to the settable composition.

* * * * *